United States Patent
Ishiga

(10) Patent No.: US 8,238,683 B2
(45) Date of Patent: Aug. 7, 2012

(54) IMAGE PROCESSING METHOD

(75) Inventor: Kenichi Ishiga, Yokohama (JP)

(73) Assignee: Nikon Corporation, Tokyo (JP)

( * ) Notice: Subject to any disclaimer, the term of this patent is extended or adjusted under 35 U.S.C. 154(b) by 1011 days.

(21) Appl. No.: 12/230,161

(22) Filed: Aug. 25, 2008

(65) Prior Publication Data

US 2009/0046943 A1    Feb. 19, 2009

Related U.S. Application Data

(63) Continuation of application No. PCT/JP2007/057186, filed on Mar. 30, 2007.

(30) Foreign Application Priority Data

Mar. 31, 2006    (JP) .................................. 2006-096986

(51) Int. Cl.
    *G06K 9/40*    (2006.01)
(52) U.S. Cl. .......................... 382/260; 382/266; 382/275
(58) Field of Classification Search .................. 382/260, 382/275, 302, 266
    See application file for complete search history.

(56) References Cited

U.S. PATENT DOCUMENTS

| | | | |
|---|---|---|---|
| 5,526,446 A | 6/1996 | Adelson et al. | |
| 5,708,693 A * | 1/1998 | Aach et al. | 378/62 |
| 5,963,676 A | 10/1999 | Wu et al. | |
| 6,754,398 B1 | 6/2004 | Yamada | |
| 6,766,062 B1 | 7/2004 | Donoho et al. | |
| 6,781,625 B2 | 8/2004 | Hayashi | |
| 6,937,772 B2 | 8/2005 | Gindele | |
| 2002/0071600 A1 * | 6/2002 | Yamada | 382/132 |
| 2002/0196907 A1 * | 12/2002 | Shinbata | 378/210 |
| 2004/0252907 A1 * | 12/2004 | Ito | 382/260 |

(Continued)

FOREIGN PATENT DOCUMENTS

JP    A-2000-224421    8/2000

(Continued)

OTHER PUBLICATIONS

Lee, "Digital Image Smoothing and the Sigma Filter," *Computer Vision, Graphics and Image Processing*, vol. 24, 1983, pp. 255-269.

(Continued)

*Primary Examiner* — Jon Chang
(74) *Attorney, Agent, or Firm* — Oliff & Berridge, PLC

(57) ABSTRACT

An image processing method adopted to remove noise present in an image, includes: an image input step in which an original image constituted of a plurality of pixels is input; a multiple-resolution images generation step in which a plurality of band-limited images with resolutions decreasing in sequence are generated by filtering the input original image; a first noise removal step in which virtual noise removal processing is executed individually for each of the band-limited images; a second noise removal step in which actual noise removal processing is executed for the individual band-limited images based upon the band-limited images from which noise has been virtually removed through the first noise removal step; and an image acquisition step in which a noise-free image of the original image is obtained based upon the individual band-limited images from which noise has been actually removed through the second noise removal step, and the virtual noise removal processing executed in the first noise removal step and the actual noise removal processing executed in the second noise removal step are differentiated in correspondence to a frequency band of a band-limited image.

23 Claims, 20 Drawing Sheets

U.S. PATENT DOCUMENTS

2004/0258325 A1   12/2004   Sasada
2006/0029287 A1*   2/2006   Hayashi et al. ............... 382/261

FOREIGN PATENT DOCUMENTS

| JP | A-2001-167264 | 6/2001 |
| JP | A-2001-211327 | 8/2001 |
| JP | A-2004-242285 | 8/2004 |
| WO | WO 2006/064913 A1 | 6/2006 |
| WO | WO 2006/068025 A1 | 6/2006 |
| WO | WO 2006/106919 A1 | 10/2006 |

OTHER PUBLICATIONS

Tomasi et al., "Bilateral Filtering for Gray and Color Images," *Proceedings of the 1998 IEEE International Conference on Computer Vision*, Bombay, India.

Burt et al., "The Laplacian Pyramid as a Compact Image Code," *IEEE Transactions on Communications*, vol. 31, No. 4, Apr. 1983, pp. 532-540.

Freeman et al., "The Design and Use of Steerable Filters," *IEEE Transactions on Pattern Analysis and Machine Intelligence*, vol. 13, No. 9, Sep. 1991, pp. 891-906.

Ranganath, "Image Filtering Using Multiresolution Representations," *IEEE Transactions on Pattern Analysis and Machine Intelligence*, vol. 13, No. 5, May 1991, pp. 426-440.

European Office Action dated May 2, 2011 in corresponding European Application No. 07 740 622.1.

Aydin et al.; "Multidirectional and Multiscale Edge Detection via $M$-Band Wavelet Transform;" *IEEE Transactions on Image Processing*; Sep. 1996; pp. 1370-1377; vol. 5, No. 9.

Laine et al.; "Wavelets for Contrast Enhancement of Digital Mammography;" *IEEE Engineering in Medicine and Biology*; Sep./Oct. 1995; pp. 536-550; vol. 14, No. 5.

Supplementary European Search Report dated Jul. 28, 2010 in European Patent Application No. 07 74 0622.

\* cited by examiner

FIG.4
CHROMINANCE PLANE NOISE REMOVAL THROUGH SEQUENTIAL ANALYSIS
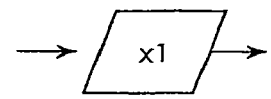
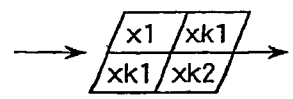
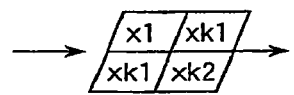
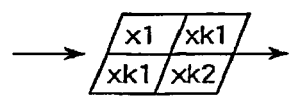
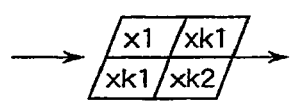
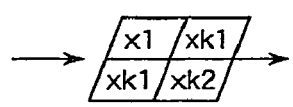

FIG.6

$$\nabla^2 = \begin{array}{|c|c|c|} \hline -1 & -1 & -1 \\ \hline -1 & 8 & -1 \\ \hline -1 & -1 & -1 \\ \hline \end{array} /16$$

FIG.7

| LL | HL |
|---|---|
| LH | HH |

WEIGHTING COEFFICIENTS APPLIED TO
LL, LH, HL AND HH NOISE COMPONENTS =

| k0 | 1 |
|---|---|
| 1 | 1 |

FIG.8

| LL | HL |
|---|---|
| LH | HH |

WEIGHTING COEFFICIENTS APPLIED TO
LL, LH, HL AND HH NOISE COMPONENTS =

| 1 | k1 |
|---|---|
| k1 | k2 |

Intensity
($\sigma$th, rth)

Graininess
(1-k0)

Sharpness
($\lambda$)

LUMINANCE PLANE NOISE REMOVAL THROUGH SEQUENTIAL SYNTHESIS

FIG.11
CHROMINANCE PLANE NOISE REMOVAL THROUGH SEQUENTIAL SYNTHESIS
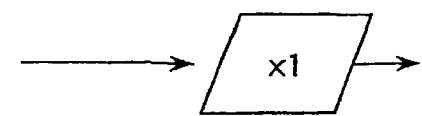
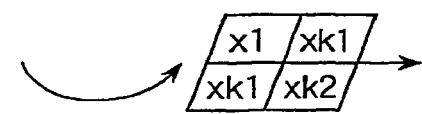
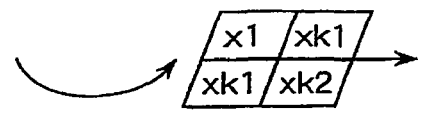
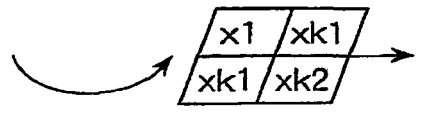
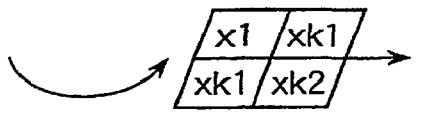
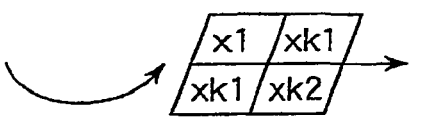

EDGE EMPHASIS USING MULTIPLE RESOLUTION TRANSFORMATION

FIG.13

| LL | HL |
|----|----|
| LH | HH |

WEIGHTING COEFFICIENTS APPLIED TO
LL, LH, HL AND HH NOISE COMPONENTS =

| k0 | k1 |
|----|----|
| k1 | k2 |

LUMINANCE PLANE NOISE REMOVAL THROUGH SEQUENTIAL ANALYSIS

IMAGE PROCESSING METHOD

This application is a continuation of International Application No. PCT/JP2007/057186 filed Mar. 30, 2007.

INCORPORATION BY REFERENCE

The disclosures of the following priority application and International application are herein incorporated by reference: Japanese Patent Application No. 2006-096986 filed Mar. 31, 2006; and International Application No. PCT/JP2007/057186 filed Mar. 30, 2007.

TECHNICAL FIELD

The present invention relates to an image processing method that may be adopted when removing noise from an image or emphasizing edges in the image.

BACKGROUND ART

There are methods known in the related art adopted to acquire a noise-free image by transforming an original image to reversible multiple-resolution images and reconstructing the image through adjustment of the transformation coefficients. A typical example of such a method is disclosed in patent reference 1. Patent reference 1 discloses a method for acquiring a noise-free image by spatially filtering for noise removal, the high-frequency subband coefficients in the multiple-resolution images resulting from the transformation and then inverse-transforming the image. Patent reference 2 discloses a contrasting method through which noise is sequentially removed from reduced images on the low-frequency subband side, which are generated on a temporary basis during the process of the multiple resolution transformation.

Patent reference 3 discloses a method through which, instead of removing noise directly on the transformation coefficient planes of the multiple-resolution images resulting from the transformation as described above, noise is removed by extracting noise components contained in the high-frequency subband transformation coefficients corresponding to LH, HL and HH resulting from the multiple resolution transformation via orthogonal wavelets, combining only the noise components through inverse wavelet transformation and subtracting the synthesized noise component from the original image, so as to assure better ease in the handling of the noise components. This method allows the extent of noise removal to be adjusted easily by applying a constant multiple factor dependent upon the image structure in the real space to the synthesized noise component prior to the final subtraction processing.

Patent reference 3 also presents an application example in which a similar technology is adopted in edge emphasis, whereby edge components, as well as the noise components, are extracted from the subband coefficients resulting from the multiple resolution transformation, the extracted edge components are combined, a constant multiple factor dependent upon the image structure is applied to the synthesized edge component in the real spatial plane and then the product is added to the original image.

Patent reference 1: U.S. Pat. No. 5,526,446
Patent reference 2: U.S. Pat. No. 6,937,772
Patent reference 3: U.S. Pat. No. 6,754,398

DISCLOSURE OF THE INVENTION

Problems to be Solved by the Invention

However, there is an issue yet to be properly addressed in the methods disclosed in all the patent reference literatures 1~3 described above, in that since only a single type of noise removal processing is executed on a given subband plane resulting from the multiple resolution transformation, it is difficult to assure both accurate removal of all the noise components present in the subband plane and reliable retention of the effective image structure information pertaining to the subband image. Namely, if noise is removed to an optimal extent at which the image structure remains intact, a residual noise component is bound to remain in a subband plane, whereas if the noise components are completely removed, the image structure is bound to be destroyed. In short, residual noise components occurring individually in correspondence to various subbands cannot be accurately extracted even by adopting the concept of the ultimate optimal noise removal rate for the entire image disclosed in patent reference 3.

There is another issue, completely different from that discussed above, with regard to the art taught in reference 3, pertaining to the ease with which the noise components and the edge components are handled in noise processing and edge emphasis processing executed through the use of multiple resolutions. Namely, since the synthesized noise components and the synthesized edge components are limited to those having been extracted in the high-frequency subbands constituting the complete system in the multiple resolution system, the frequency characteristics of the noise components and the edge components cannot be adjusted with a very high degree of freedom.

Means for Solving the Problems

According to the 1st aspect of the present invention, an image processing method adopted to remove noise present in an image, comprises: an image input step in which an original image constituted of a plurality of pixels is input; a multiple-resolution images generation step in which a plurality of band-limited images with resolutions decreasing in sequence are generated by filtering the input original image; a first noise removal step in which virtual noise removal processing is executed individually for each of the band-limited images; a second noise removal step in which actual noise removal processing is executed for the individual band-limited images based upon the band-limited images from which noise has been virtually removed through the first noise removal step; and an image acquisition step in which a noise-free image of the original image is obtained based upon the individual band-limited images from which noise has been actually removed through the second noise removal step, and the virtual noise removal processing executed in the first noise removal step and the actual noise removal processing executed in the second noise removal step are differentiated in correspondence to a frequency band of a band-limited image.

According to the 2nd aspect of the present invention, in the image processing method according to the 1st aspect, it is preferred that noise is removed to a greater extent in the virtual noise removal processing executed in the first noise removal step relative to the actual noise removal processing executed in the second noise removal step.

According to the 3rd aspect of the present invention, an image processing method adopted to remove noise present in an image, comprises: an image input step in which an original image constituted of a plurality of pixels is input; a multiple-resolution images generation step in which a plurality of band-limited images with resolutions decreasing in sequence are generated by filtering the input original image; a first noise extraction step in which noise components contained in the band-limited images are individually extracted; a second noise extraction step in which noise components to be reflected in the original image are re-extracted from the individual band-limited images based upon the noise components having been extracted from the band-limited images in the first noise extraction step; a noise synthesis step in which the noise components having been re-extracted from the band-limited images in the second noise extraction step are synthesized; and an image acquisition step in which a noise-free image of the original image is acquired based upon the synthesized noise component.

According to the 4th aspect of the present invention, in the image processing method according to the 3rd aspect, it is preferred that the noise components are intrinsically re-extracted from the individual band-limited images in correspondence to frequency bands of the band-limited images in the second noise extraction step.

According to the 5th aspect of the present invention, in the image processing method according to the 4th aspect, it is preferred that: low-frequency images and high-frequency images with resolutions decreasing in sequence are generated in the multiple-resolution images generation step; and the noise components to be reflected in the original image are re-extracted by weighting the noise components having been extracted in the first noise extraction step differently between the low-frequency images and the high-frequency images in the second noise extraction step.

According to the 6th aspect of the present invention, in the image processing method according to the 4th aspect, it is preferred that the noise components to be reflected in the original image are re-extracted by weighting the noise components having been extracted in the first noise extraction step differently between band-limited images with varying levels of resolution in the second noise extraction step.

According to the 7th aspect of the present invention, an image processing method adopted to remove noise present in an image, comprises: an image input step in which an original image constituted of a plurality of pixels is input; a multiple-resolution images generation step in which a plurality of band-limited images with resolutions decreasing in sequence are generated by filtering the input original image; a noise extraction step in which a noise component contained in one of the band-limited images is extracted and then a noise component in another band-limited image is extracted in sequence based upon the noise component having been extracted; and a noise removal step in which noise in the original image is removed based upon noise components in the individual band-limited images having been extracted, and a signal intensity level with which the noise component extracted from one band-limited image in the noise extraction step is reflected when extracting the noise component from another band-limited image during the noise extraction step is set differently from a signal intensity level with which the noise component extracted from one band-limited image in the noise extraction step is reflected in the original image during the noise removal step.

According to the 8th aspect of the present invention, in the image processing method according to the 7th aspect, it is preferred that the noise component contained in the one band-limited image is extracted and a noise component contained in another band-limited image assuming a different resolution is extracted in sequence based upon the noise component having been extracted in the noise extraction step.

According to the 9th aspect of the present invention, in the image processing method according to the 7th aspect, it is preferred that low-frequency images and high-frequency images with resolutions decreasing in sequence are generated in the multiple-resolution images generation step.

According to the 10th aspect of the present invention, an image processing method adopted to remove noise present in an image, comprises: an image input step in which an original image constituted of a plurality of pixels is input; a multiple-resolution images generation step in which sets of band-limited images each constituted with at least two types of band-limited images are generated in sequence over a plurality of resolutions by filtering the input original image, generating a set of band-limited images constituted with at least two different types of band-limited images and then repeatedly filtering at least one type of band-limited images among the band-limited images; a noise extraction step in which processing whereby noise components contained in the two types of band-limited images are extracted and a noise component in at least one type of band-limited image at another resolution is extracted based upon the extracted noise components, is executed in sequence so as to extract noise components in the individual band-limited images at various resolutions; and a noise removal step in which noise in the original image is removed from based upon noise components in the individual band-limited images having been extracted, and an inter-band signal intensity with which a set of noise components of at least two types of band-limited images obtained through the noise extraction step is reflected when extracting the noise component in another band-limited image in the noise extraction step is set differently from an inter-band signal intensity with which the set of noise components of at least two types of band-limited images obtained through the noise extraction step is reflected in the original image during the noise removal step.

According to the 11th aspect of the present invention, in the image processing method according to the 7th aspect, it is preferred that two different types of images that are low-frequency images and high-frequency images are generated to make up the sets of band-limited images constituted with at least two different types of band-limited images in the multiple resolution image generation step.

According to the 12th aspect of the present invention, an image processing method adopted to remove noise present in an image, comprises: an image input step in which an original image constituted of a plurality of pixels is input; a multiple-resolution images generation step in which one or more low-frequency images with resolutions decreasing in sequence and one or more high-frequency images with the resolutions decreasing in sequence are generated by decomposing the input original image; a noise modulation step in which a noise component contained in each low-frequency image and a noise component contained in each high-frequency image are individually extracted, a low-frequency noise image and a high-frequency noise image are generated in correspondence to the low-frequency image and the high-frequency image and weights applied to the noise components over different frequency bands are modulated by applying a weighting coefficient to at least either the low-frequency noise image or the high-frequency noise image having been generated; a noise synthesis step in which the low-frequency noise image and the high-frequency noise image having undergone the noise modulation step are combined to generate a single synthesized noise image with higher resolution by one stage and noise images are repeatedly synthesized in sequence until a single noise image signal with a resolution matching the resolution of the original image is obtained; and a noise removal step in which noise contained in the original image is removed based upon the synthesized noise image signal.

According to the 13th aspect of the present invention, an image processing method adopted to remove noise present in an image, comprises: an image input step in which an original image constituted of a plurality of pixels is input; a multiple-resolution images generation step in which one or more low-frequency images having resolutions decreasing in sequence and one or more high-frequency images with the resolutions decreasing in sequence are generated by decomposing the input original image; a noise extraction step in which a noise component contained in each low-frequency image and a noise component contained in each high-frequency image are individually extracted and a low-frequency noise image and a high-frequency noise image are generated in correspondence to the low-frequency image and the high-frequency image; a noise modulation step in which weights applied to the noise components over different frequency bands are modulated by applying a weighting coefficient to at least either the low-frequency noise image or the high-frequency noise image having been generated; a noise synthesis step in which the low-frequency noise image and the high-frequency noise image having undergone the noise modulation step are combined to generate a single synthesized noise image with higher resolution by one stage and the synthesized noise image with the higher resolution is combined with the low-frequency noise image corresponding to the low-frequency image with the higher resolution by one stage so as to generate a new synthesized low-frequency noise image; a noise synthesis repeating step in which synthesis is repeatedly executed by repeating a sequence of the noise extraction step, the noise modulation step and the noise synthesis step until a single noise image signal with a resolution matching the resolution of the original image is obtained; and a noise removal step in which noise contained in the original image is removed based upon the synthesized noise image signal.

According to the 14th aspect of the present invention, an image processing method adopted to remove noise present in an image, comprises: an image input step in which an original image constituted of a plurality of pixels is input; a multiple-resolution images generation step in which one or more low-frequency images with resolutions decreasing in sequence and one or more high-frequency images with the resolutions decreasing in sequence are generated by decomposing the input original image; a noise extraction step in which a noise component contained in each low-frequency image and a noise component contained in each high-frequency image are individually extracted and a low-frequency noise image and a high-frequency noise image are generated in correspondence to the low-frequency image and the high-frequency image; a noise modulation step in which weights applied to the noise components over different frequency bands are modulated by applying a weighting coefficient to at least either the low-frequency noise image or the high-frequency noise image having been generated; a noise synthesis step in which the low-frequency noise image and the high-frequency noise image having undergone the noise modulation step are combined to generate a single synthesized noise image with higher resolution by one stage; and a noise removal step in which noise contained in the original image is removed based upon the synthesized noise image.

According to the 15th aspect of the present invention, an image processing method adopted to remove noise present in an image, comprises: an image input step in which an original image constituted of a plurality of pixels is input; a multiple-resolution images generation step in which one or more low-frequency images with resolutions decreasing in sequence and one or more high-frequency images with the resolutions decreasing in sequence are generated by decomposing the input original image; a noise extraction step in which a noise component contained in each low-frequency image and a noise component contained in each high-frequency image are individually extracted and a low-frequency noise image and a high-frequency noise image are generated in correspondence to the low-frequency image and the high-frequency image; a noise modulation step in which weights applied to the noise components over different frequency bands are modulated by applying a weighting coefficient to at least either the low-frequency noise image or the high-frequency noise image having been generated; a noise synthesis step in which the low-frequency noise image and the high-frequency noise image having undergone the noise modulation step are combined to generate a single synthesized noise image with higher resolution by one stage and the synthesized noise image with the higher resolution is combined with the low-frequency noise image corresponding to the low-frequency image with the higher resolution by one stage so as to generate a new synthesized low-frequency noise image; and a noise removal step in which noise contained in the original image is removed based upon the synthesized noise image signal.

According to the 16th aspect of the present invention, in the image processing method according to any one of the 12th through 15th aspects, it is preferred that the low-frequency noise image and the high-frequency noise image corresponding to the low-frequency image and the high-frequency image are generated based upon observation of local signal values in the low-frequency image and the high-frequency image in the noise extraction step.

According to the 17th aspect of the present invention, an image processing method adopted to emphasize edges in an image, comprises: an image input step in which an original image constituted of a plurality of pixels is input; a multiple-resolution images generation step in which one or more low-frequency images with resolutions decreasing in sequence and one or more high-frequency images with the resolutions decreasing in sequence are generated by decomposing the input original image; an edge component generation step in which an edge component is extracted by applying a band pass filter to each low-frequency image and an edge component is extracted by applying a band pass filter to each high-frequency image and a low-frequency edge component image and a high-frequency edge component image are generated in correspondence to the low-frequency image and the high-frequency image; an edge component modulation step in which weights applied to the edge components over different frequency bands are modulated by applying a weighting coefficient to at least either the low-frequency edge component image or the high-frequency edge component image having been generated; an edge component synthesis step in which the low-frequency edge component image and the high-frequency edge component image having undergone the edge component modulation step are combined to generate a single synthesized edge component image with higher resolution by one stage and edge component images are repeatedly synthesized in sequence until a single edge component image with a resolution thereof matching the resolution of the original image is obtained; and an edge emphasis step in which edges contained in the original image are emphasized based upon the synthesized edge component image.

According to the 18th aspect of the present invention, an image processing method adopted to emphasize edges in an image, comprises: an image input step in which an original image constituted of a plurality of pixels is input; a multiple-resolution images generation step in which one or more low-frequency images having resolutions decreasing in sequence and one or more high-frequency images with the resolutions decreasing in sequence are generated by decomposing the input original image; an edge component generation step in which an edge component is extracted by applying a band pass filter to each low-frequency image and an edge component is extracted by applying a band pass filter to each high-frequency image and a low-frequency edge component image and a high-frequency edge component image are generated in correspondence to the low-frequency image and the high-frequency image; an edge component modulation step in which weights applied to the edge components over different frequency bands are modulated by applying a weighting coefficient to at least either the low-frequency edge component image or the high-frequency edge component image having been generated; an edge component synthesis step in which the low-frequency edge component image and the high-frequency edge component image having undergone the edge component modulation step are combined to generate a single synthesized edge component image with a higher resolution by one stage; and an edge emphasis step in which edges contained in the original image are emphasized based upon the synthesized edge component image.

According to the 19th aspect of the present invention, in the image processing method according to any one of the 5th, 9th and 11th through 18th aspects, it is preferred that the low-frequency image and the high-frequency image correspond to 1) a low-frequency component and a high-frequency component generated through orthogonal wavelet transformation, 2) a Gaussian component and a Laplacian component in a Laplacian pyramid representation, or 3) a low-frequency component and high-frequency components each corresponding to a specific direction in directional wavelet transformation.

According to the 20th aspect of the present invention, in the image processing method according to the 19th aspect, it is preferred that when multiple-resolution images are generated through two-dimensional orthogonal wavelet transformation, the low-frequency image corresponds to an LL subband and the high-frequency image corresponds to an LH subband, an HL subband or an HH subband.

According to the 21st aspect of the present invention, an image processing method adopted to remove noise present in an image, comprises: inputting an original image constituted of a plurality of pixels; sequentially generating images with varying resolutions by that the input original image undergoes multiple resolution transformation; extracting a noise component by using an image generated at a given resolution; using the noise component extracted at the given resolution for purposes of extracting a noise component at another resolution and synthesizing a noise component to be removed from the original image through inverse multiple resolution transformation; and applying different weights to the noise component extracted at the given resolution to be used for purposes of extracting the noise component at the other resolution and to the noise component extracted at the given resolution to be used to synthesize the noise component to be removed from the original image through inverse multiple resolution transformation.

According to the 22nd aspect of the present invention, an image processing program enables a computer or an image processing apparatus to execute an image processing method according to any one of the 1st through the 21st aspects.

According to the 23rd aspect of the present invention, an image processing apparatus comprises an image processing program according to the 22nd aspect installed therein.

Advantageous Effect of the Invention

The present invention, assuming the structure described above, allows noise to be removed for noise extraction with a high level of freedom by an extent matching the required intensity without being restricted by the conditions for retaining the image structure intact, so as to assure accurate noise extraction, and also allows the original image structure to be retained intact, by assuring preservation of the image structure.

BEST MODE FOR CARRYING OUT THE INVENTION

Basic Concept

Figure 1:
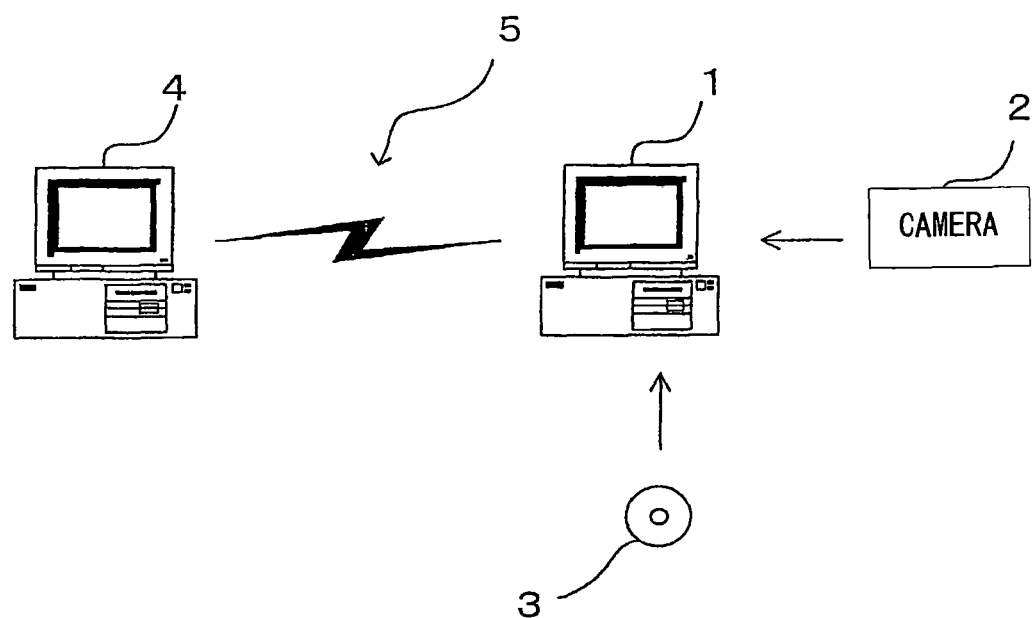
FIG. 1 The image processing apparatus achieved in an embodiment of the present invention FIG. 2 A flowchart of the color space conversion processing executed by the personal computer 1

First, the rationale and the reasoning for the need to adopt the algorithms to be described in reference to the embodiments and the basic concept of the method to be adopted in conjunction with the algorithms are explained.

As described above, the technologies proposed in the related art, which use multiple-resolution representations, are divided into two primary groups. There are various methods of multiple-resolution representations, such as Steerable wavelet transformation and DCT pyramid representation as well as orthogonal wavelet transformation and Laplacian-pyramid representation. Since the relationship with which the individual methods correspond to one another has been made clear in the references of the known art, an explanation is given on a single example, i.e., orthogonal wavelet transformation, for purposes of simplification.

In a first method, noise is removed from high-frequency-side subbands (LH, HL, HH) resulting from the orthogonal wavelet transformation. In a second method, noise is removed sequentially from the low-frequency subband (LL) resulting from the orthogonal wavelet transformation.

Noise is normally removed from a color image by dividing the color image into a luminance (brightness) plane and chrominance (color difference) planes and individually removing noise from the luminance plane and the chrominance planes. Grainy noise is reduced by removing noise from the luminance plane, whereas color mottling noise is reduced by removing noise from the chrominance planes.

The following has become clear as a result of a test conducted by adopting these two different types of algorithms in conjunction with a color image expressed in luminance-chrominance representation. Namely, both effective color mottling noise removal and desirable color structure preservation are assured when removing noise from the chrominance components through the method whereby noise is sequentially removed from the low-frequency subband rather than through the method whereby noise is removed from the high-frequency subbands. In other words, unlike noise removal from the high-frequency-side subbands in the chrominance components, which is problematic in that it readily induces bleeding at color boundaries, noise removal from the low-frequency-side subbands does not readily induce bleeding at color boundaries.

At the same time, it has been learned that noise can be removed from the luminance component more effectively through noise removal from the high-frequency subbands rather than through the method whereby noise is removed sequentially from the low-frequency component. In other words, the sequential noise removal from the low-frequency subband in the luminance component is problematic in that the gradation can be easily lost and a flat image that looks "binary image" may be created. The noise removal from the high-frequency subbands, on the other hand, assures gradation retention and preserves the image structure such as the texture of the image in a desirable manner.

This characteristic difference between the luminance component and the chrominance components is assumed to be attributable to the difference between the frequency characteristics of the image structure on the luminance plane and the frequency characteristics of the image structure on the chrominance planes, which necessitates the noise components in the luminance plane and the chrominance planes to be extracted in different frequency spaces.

Accordingly, the noise removal for the luminance component was executed by removing noise from the high-frequency subbands as in the related art and the noise removal for the chrominance components was executed by sequentially removing noise from the low-frequency subband as in the related art. The results of this experiment indicated that no matter how superior an edge-preserving smoothing filter may be used as each noise removal filter, noise components manifesting as streaks or checkered patterns will not be removed over flat areas in the luminance component and color noise manifesting as points is likely to remain to a significant extent, particularly around color boundary areas in the chrominance components.

Figure 15:
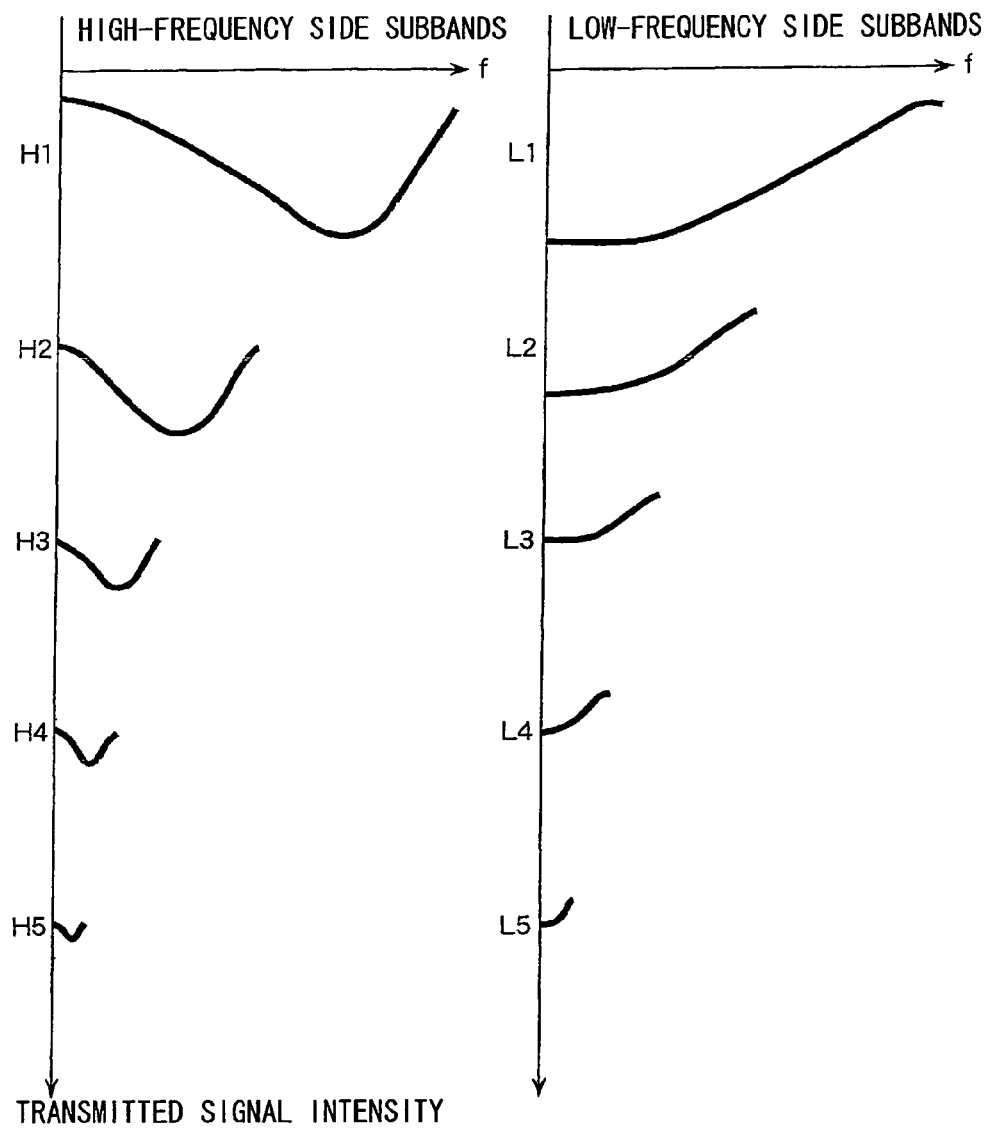

FIG. 15 schematically illustrates the frequency bands covered by the high-frequency subbands and the low-frequency subband in a multiple-resolution representation. In reference to FIG. 15, the issues discussed above are further examined, first with regard to the luminance component. Since the original image can be completely reconstructed simply by expressing it with a low-frequency subband corresponding to the lowest resolution and high-frequency subbands corresponding to the individual resolutions, the noise component over the full frequency band would appear to be covered at a superficial level simply through the noise removal from the high-frequency subbands alone. However, as noise is sequentially removed from the high-frequency components at varying levels of resolution, the noise component may not be extracted to the full extent over areas where the intensity of the frequency bands overlapping each other in different resolutions is low.

Likewise, the noise component over the full frequency band would appear to be covered at a superficial level with regard to the chrominance component processing, simply as the noise in the low-frequency subband alone is removed. However, point-like noise are primarily detected as high-frequency component-side signals as the original image is broken down to the low-frequency component and the high-frequency components, allowing the noise component entering the high-frequency component side, to remain.

The opposite characteristics discussed above can be assumed to cause the difference in the optimal frequency space for the luminance component noise extraction and the chrominance component noise extraction. Namely, the findings obtained through the conducted testing substantiate the fact that the smoothing filtering processing executed on the real space plane handled via a single channel or on low-frequency side subbands in a multiple-resolution representation handled via multiple channels is likely to lead to gradation loss whereby the gradations are adjusted to a uniform level matching the average within the filtering range.

This fact leads to the conclusion that the majority of the edge component in the image structure is reflected in the luminance component, with a great deal of noise component, too, also readily directed to the high-frequency subband side. Under such circumstances, the noise component cannot be extracted successfully on the low-frequency subband side and loss of gradation characteristics occurs readily.

The chrominance components, on the other hand, are generally regarded to readily reflect an image component representing overall color information with a gentle behavioral pattern over a wide range. The chrominance components are thus normally assumed not to contain significant color texture that changes drastically. Accordingly, the noise component can be separated from the chrominance components more easily on the low-frequency side, unlike the noise component in the luminance component, which can be extracted more easily on the high-frequency side. However, as the noise component fluctuation information readily flows into the high-frequency subbands as well, as is widely known, and a target original image may contain significant color texture, noise component separation on the high-frequency subband side is also likely to be necessary.

These issues are addressed in the embodiment by extracting noise components both from the high-frequency subbands and from the low-frequency subband so as to pick up the residual noise component from a subband which has a conjugate relation to the subbands initially used for the noise removal. The conjugate subband is the low-frequency subband when removing the noise in the luminance component but is a high-frequency subband when removing the noise in a chrominance component.

However, as has been confirmed through testing, noise removal from the conjugate subband is likely to result in image structure destruction as explained earlier and thus, successful noise removal cannot be achieved by simply adopting the method described above. Accordingly, in the concept adopted in the embodiment, the noise component extraction and the actual noise removal are regarded as separate processes and the role of the conjugate subband in the actual noise removal is basically regarded as a complementary role, so as to prevent destruction of the image structure.

Namely, in the actual noise removal, noise is removed from the luminance component by assigning the high-frequency side subbands as primary bands and assigning the low-frequency side subband as a complementary band, whereas noise is removed from the chrominance component by assigning the low-frequency side subband as a primary band and assigning the high-frequency side subbands as complementary bands. However, if a high-performance noise removal filter is used in the chrominance component noise removal, the roles of the primary band and the complementary bands do not need to be as distinguishable as those of the primary bands and the complementary band used in the luminance component noise removal and the levels of their efficacy may be substantially equal to each other, according to the findings obtained through testing. The rationale for this may be that the difference of the overall characteristics between the luminance plane and the chrominance plane integrating the difference of image structure characteristics and the noise component flow characteristics with which the noise component flows between the various bands, implies the presence of different frequency projection spaces optimal for the luminance plane noise removal and the chrominance plane noise removal.

However, if the extent of noise removal from a complementary band is set at a somewhat low level, the residual noise component will not be fully extracted even from the complementary band. Accordingly, the role assignment to the individual subbands should be adjusted in the actual noise removal. According to the present invention, the noise extraction and the noise removal are conceptualized separately, allowing for flexible thinking in that as long as a subband image is used solely for purposes of noise extraction, the subband image can be virtually destroyed as much as needed down to the level at which accurate noise extraction is enabled. Namely, in the concept adopted in the present invention, there are two different types of noise removal, i.e., virtual noise removal executed for noise extraction and noise removal executed as the actual noise removal processing.

Through the measures described above, an environment, in which the residual streaking noise in the luminance component can be extracted easily as data clearly distinguishable from the image structure data in the low-frequency image, is created and an environment in which the residual point-like noise in the chrominance components can be easily extracted as data clearly distinguishable from the image structure data in a high-frequency image is created.

In order to enable more accurate noise extraction via virtual noise removal, a method of extracting noise components codependent on one another at varying resolutions, instead of extracting the noise component independently of one another from the individual subband planes corresponding to the low-frequency image and the high-frequency image, is adopted. Namely, noise is fully removed from an upper layer subband image or a lower layer subband image at different resolutions to achieve a noise-free state even if it means the image structure is virtually destroyed, the results of the noise removal are reflected on the subband at the currently targeted resolution and noise is extracted sequentially as the resolution is switched.

The method for extracting noise from the low-frequency side subband by sequentially switching the resolution has already been disclosed in the related art in U.S. Pat. No. 6,937,772 and Japanese Laid Open Patent Publication No. 2000-224421. However, according to the present invention, the concept is also adopted in noise removal mainly from the high-frequency side subbands or from both the low-frequency side and the high-frequency side. Specific methods with which the art may be effectively adopted under such circumstances will be described later in reference to embodiments.

The sequential noise removal is advantageous in that when it is adopted in noise removal from both the high-frequency band and the low-frequency band, the noise extraction performance in the complementary band is significantly enhanced. Namely, noise manifesting as vertical/horizontal streaks or a checkered pattern present in the low-frequency side complementary band can be completely extracted through the sequential noise removal adopted in conjunction with the luminance component, whereas point-like noise present in the high-frequency side complementary band can be extracted fully through the sequential noise removal adopted in conjunction with the chrominance components.

In a sense, the use of orthogonal wavelet transformation with a lesser overcompleteness of processing as a secondary two-dimensional separation filter also indirectly contributes to the specific characteristics of the residual noise component in the luminance component, manifesting as the vertical/horizontal streaks or checkered patterns. In order to eliminate any such specific directionality, Steerable wavelets may be utilized so as to generate high-frequency bands in correspondence to multiple directions in the multiple resolution transformation.

However, since high-frequency bands are generated in correspondence to multiple directions, a greater number of planes will need to be processed for noise removal, requiring a much greater memory capacity to hold data used in the processing. In other words, the Steerable wavelet method entailing a great increase in the processing load cannot be adopted with ease. As an alternative technology, the sequential noise removal, which can be adopted with ease and simplicity, effectively addresses the issues discussed earlier, and its effectiveness is further enhanced when adopted both in conjunction with both the low-frequency subband and the high-frequency subbands.

However, the advantages of the present invention, described in reference to the embodiments, are not limited to noise removal through the orthogonal wavelet transformation and they will be also effective in noise removal in an image in multiple-resolution representations such as the Laplacian-pyramid representation and the Steerable wavelet transformation since the technology according to the present invention successfully complements the weaknesses in the multiple resolution transformation filter characteristics of the Laplacian-pyramid representation and the Steerable wavelet transformation.

Virtual noise removal may be sequentially reflected among various resolutions by disintegrating the resolution toward the lower side or by integrating the resolution toward the higher side. The former method is referred to as "sequential analysis" and the latter is referred to as "sequential synthesis" in the description of embodiments.

The term "analysis" in this context implies breaking down image data to multiple resolution data at lower resolutions, whereas the term "synthesis" in this context is equivalent to integrating the broken down multiple resolution data into the initial high-resolution data (synthesizing the initial high-resolution data). In the case of wavelet transformation, the term "analysis" refers to the wavelet transformation and the term "synthesis" refers to inverse wavelet transformation. A method that may be adopted in the "sequential analysis" is described in the first embodiment and a method that may be adopted in the "sequential synthesis" is described in reference to the second embodiment.

First Embodiment

FIG. 1 shows the image processing apparatus achieved in an embodiment of the present invention. The image processing apparatus is constituted with a personal computer 1. The personal computer 1, which is connected with a digital camera 2, a recording medium 3 such as a CD-ROM, another computer 4 and the like, is able to receive various types of image data. The personal computer 1 executes the image processing to be explained below on the image data provided thereto. The personal computer 1 is connected to the computer 4 via an electronic communication network 5, which may be the Internet.

Figure 19:
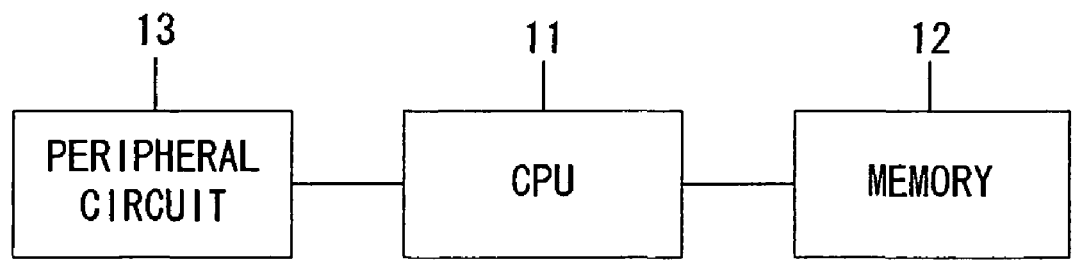

The program that enables the computer 1 to execute the image processing is provided in a recording medium such as a CD-ROM or by another computer via the Internet or another electronic communication network connected to the personal computer in a manner similar to that shown in FIG. 1, and the program thus provided is installed within the personal computer 1. FIG. 19 shows the structure adopted in the personal computer 1. The personal computer 1 comprises a CPU 11 and its peripheral circuits 13. The installed program is executed by the CPU.

The program to be provided via the Internet or another electronic communication network is converted to and transmitted as a signal on a carrier wave which is carried through the electronic communication network, i.e., a transmission medium. Namely, the program can be distributed as a computer-readable computer program product adopting any of various modes including a recording medium and a carrier wave.

Figure 2:
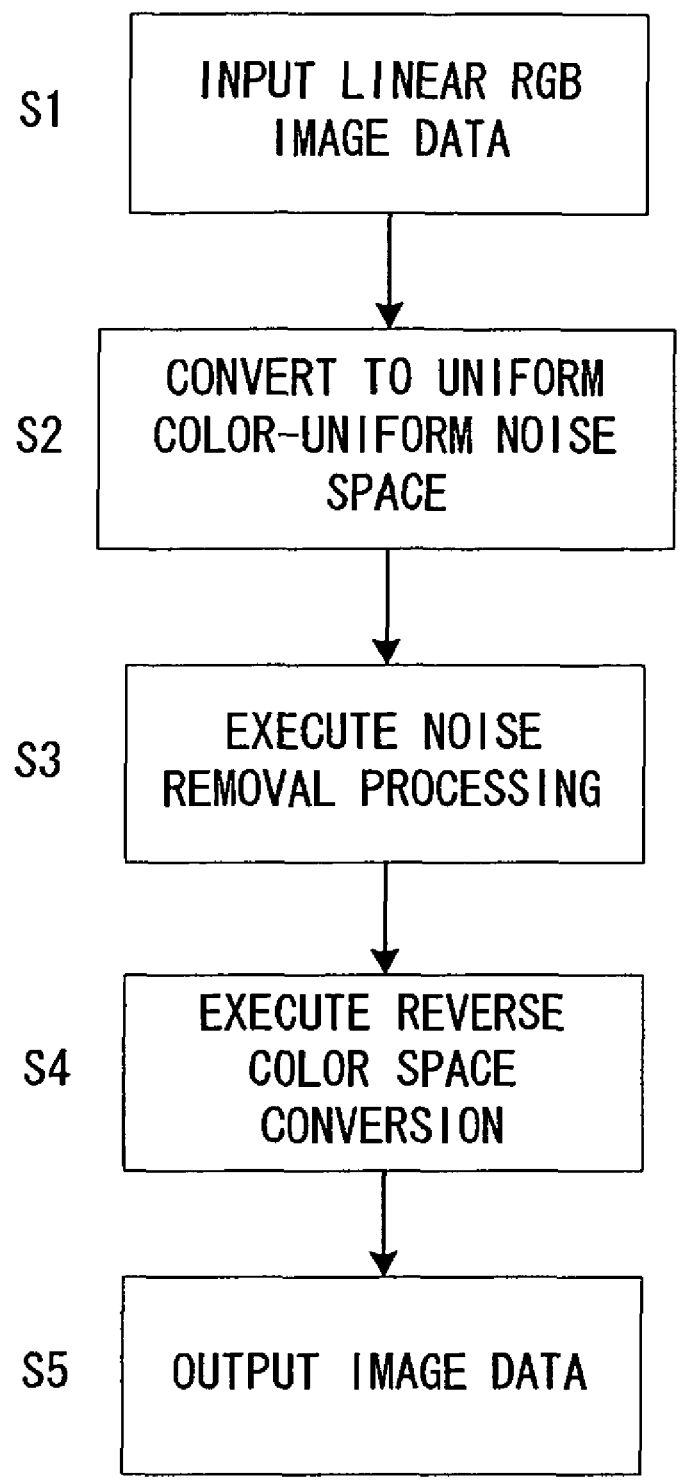

The following is an explanation of the image processing executed by the personal computer 1. FIG. 2 presents a flowchart of the image processing executed by the personal computer 1 in the first embodiment. In step S1, linear RGB image data are input. In step S2, the input image data are converted to data in a uniform color and uniform noise space. In step S3, the data undergo noise removal processing. In step S4, the color space data undergo reverse conversion. In step S5, the image data having undergone the processing are output. The following is a detailed explanation of the processing executed in each step.

(1) Color Space Conversion

In step S1, RGB color image data with linear gradation with respect to the light intensity are input. In step S2, the input image data are converted to data in a uniform noise space in which the noise is set to the uniform level relative to the gradations, so as to create an environment in which noise removal is facilitated. In the embodiment, the image data are converted to data in a uniform color and uniform noise space so as to further assure color uniformity as well as noise uniformity, thereby providing both the noise removal effect and the color reproducibility retention effect.

Such a uniform color and uniform noise space used as the image processing space is described in Japanese Patent Application No. 2004-365881 submitted by the inventor of the present invention and accordingly, Japanese Patent Application No. 2004-365881 should be referred to for details of the uniform color and uniform noise space. The following explanation is provided by assuming that the target input data are sRGB image data. It is to be noted, however, that gamma correction, having been executed on the sRGB image should first be undone, to revert to the initial image with linear gradation before starting the processing.

First, the linear gradation RGB values are converted to XYZ values. Namely, the image data are converted to the XYZ calorimetric system space. This processing is executed through 3×3 matrix conversion, which is defined in correspondence to the RGB original stimulus spectral characteristics. For instance, the data constituting the input sRGB image may undergo the following standardized conversion.

$$X = 0.4124*R + 0.3576*G + 0.1805*B \quad (1)$$

$$Y = 0.2126*R + 0.7152*G + 0.0722*B \quad (2)$$

$$Z = 0.0193*R + 0.1192*G + 0.9505*B \quad (3)$$

Next, the data in the XYZ space are converted to a nonlinear gradation $L^\wedge a^\wedge b^\wedge$ space representing a perceptive attribute with a pseudo-uniform color distribution. In this description, the term "$L^\wedge a^\wedge bb^\wedge$ space" is used to refer to a variation of the uniform color space L*a*b* in the related art achieved by modifying the L*a*b* space so as to assume noise uniformity.

$$L^\wedge = 100 * f(Y/Y0) \quad (4)$$

$$a^\wedge = 500 * [f(X/X0) - f(Y/Y0)] \quad (5)$$

$$b^\wedge = 200 * [f(Y/Y0) - f(Z/Z0)] \quad (6)$$

X0, Y0 and Z0 in the expressions above each represent a value determined in correspondence to the illuminating light. For instance, X0, Y0 and Z0 may assume values 95.045, 100.00 and 108.892 respectively in a 2° visual field under standard light D65. In addition, the nonlinear gradation conversion function $f(t)$ is defined below. Noise uniformity is achieved based upon the characteristics of the function $f(t)$. It is to be noted that the variable t, expressed as; t=(Y/Y0), t=(X/X0), t=(Z/Z0), assumes a value normalized based upon the maximum value representing the number of gradations for the X, Y and Z values so that the relationships expressed as $0 \leq (Y/Y0) \leq 1$, $0 \leq (X/X0) \leq 1$, $0 \leq (Z/Z0) \leq 1$, are satisfied.

[Expression 1]

$$f(t) = t + \sqrt{t + \epsilon} \quad (7)$$

If necessary, the origin point and the saturation point may be normalized by using the following expression.

[Expression 2]

$$f(t) = \frac{\sqrt{t + \epsilon} - \sqrt{\epsilon}}{\sqrt{1 + \epsilon} - \sqrt{\epsilon}} \quad (8)$$

$\epsilon$ in the expression above represents an offset signal applied to the linear gradation signal. While $\epsilon$ assumes a value depending on the specific sensor in use, a value very close to zero, for instance, will be assumed when a low sensitivity setting is selected and a value approximately equal to 0.05 will be assumed when a high sensitivity setting is selected.

(2) Noise Removal

Figure 3:
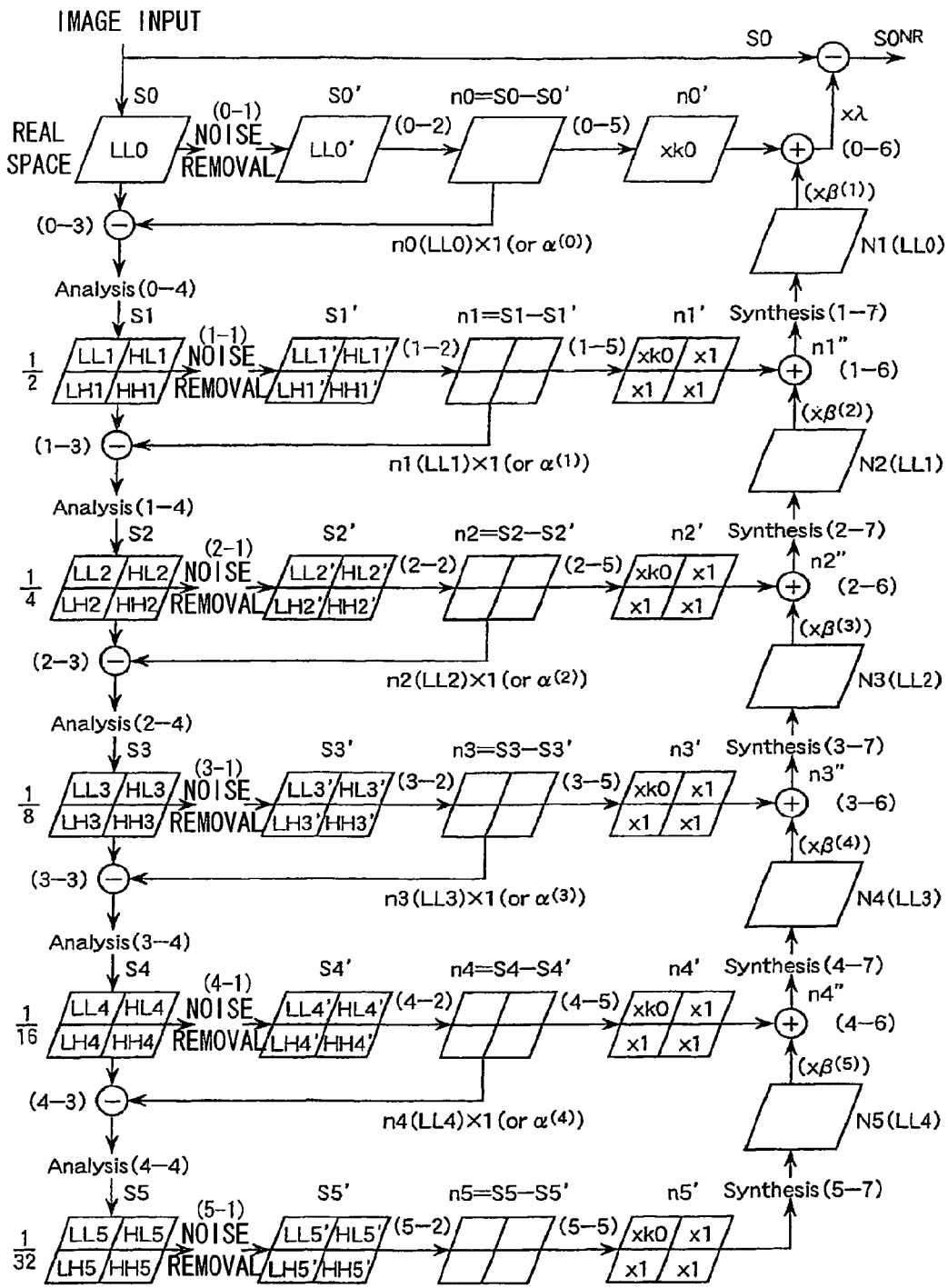
FIG. 3 A flowchart of the luminance component processing executed in a first embodiment FIG. 4 A flowchart of the chrominance component processing executed in the first embodiment FIG. 5 The subband division achieved through five-stage wavelet transformation FIG. 6 The simplest Laplacian filter commonly in use FIG. 7 The weighting coefficients for the low-frequency subband (LL) and the high-frequency subbands (LH, HL, HH) of the noise component in the luminance component FIG. 8 The weighting coefficients for the low-frequency subband (LL) and the high-frequency subbands (LH, HL, HH) of the noise component in a chrominance component FIGS. 9A-9C A setting screen that may be brought up when setting intensity parameters (intensity) σth, rth, a frequency characteristics adjustment parameter (graininess) k0 and a parameter (sharpness) λ related to the noise removal intensity FIG. 10 A flowchart of the luminance component processing executed in a second embodiment FIG. 11 A flowchart of the chrominance component processing executed in the second embodiment FIG. 12 A flowchart of the edge emphasis processing using multiple resolution transformation FIG. 13 The weighting coefficients for the low-frequency subband (LL) and the high-frequency subbands (LH, HL, HH) of the edge component in the luminance component FIG. 14 A schematic diagram illustrating the relationship between the low-frequency subband and the high-frequency subbands in various types of multiple-resolution representations FIG. 15 A schematic illustration of frequency bands covered in the high-frequency subbands and the low-frequency subband in a multiple-resolution representations FIG. 16 A flowchart of luminance component processing similar to that shown in FIG. 3, except that specific noise removal processing on the image signals in the real space is skipped FIG. 17 A flowchart of luminance component processing similar to that shown in FIG. 10, except that specific noise removal processing on the image signals in the real space is skipped FIG. 18 A flowchart of edge emphasis processing using multiple resolution transformation, similar to that shown in FIG. 12 except that specific edge component extraction processing on the image signals in the real space is skipped FIG. 19 The structure adopted in a personal computer FIG. 20 A flowchart of the noise removal processing executed to remove noise in the luminance component (luminance signal) in a variation of the first embodiment

The noise removal processing executed in step S3 is now explained. FIG. 3 presents a flowchart of the processing executed for the luminance (brightness) component (luminance signal), whereas FIG. 4 presents a flowchart of the processing executed for a chrominance (color difference) component (color different signal). However, FIG. 4 simply presents the part of the chrominance component processing that differs from the luminance component processing in FIG. 3, as detailed later.

(2-1) Multiple Resolution Transformation

While FIGS. 3 and 4 illustrate multiple resolution (multi-resolution) transformation achieved through five-stage wavelet transformation, the number of stages over which wavelet transformation is executed may be adjusted in correspondence to the size of the input original image. As long as the wavelet transformation is executed over approximately five stages, the frequency band of the target noise component can be substantially covered under normal circumstances.

(2-1-1) Wavelet Transformation: Analysis/Decomposition Process

In the wavelet transformation, through which image data are transformed into frequency component data, the frequency component in the image is divided into a high-pass component and a low-pass component. In the embodiment, a 5/3 filter is utilized to execute the five-stage wavelet transformation mentioned above. The 5/3 filter generates the low-pass component with a filter having five taps (one-dimension/5 pixels) and generates the high-pass component with a filter having three taps (one-dimension/3 pixels).

The high-pass component and the low-pass component are generated as expressed below. In the expressions, n indicates the pixel position and x[ ] indicates the pixel value assumed at the target image undergoing the wavelet transformation. For instance, n assumes a value in the range of 0~49 if 100 pixels are set along the horizontal direction. By extracting the high-pass component and the low-pass component as expressed below, the high-pass component and the low-pass component data at 50 pixels, i.e., half the pixels, are extracted.

$$\text{High-pass component: } d[n]=x[2n+1]-(x[2n+2]+x[2n])/2 \qquad (9)$$

$$\text{Low-pass component: } s[n]=x[2n]+(d[n]+d[n-1])/4 \qquad (10)$$

The one-dimensional wavelet transformation defined as described above is executed along the horizontal direction and the vertical direction independently through two-dimensional separation filtering processing so as to achieve wavelet decomposition. The coefficient s is directed onto the L plane, whereas the coefficient d is directed onto the H plane. The real space plane, identical to the input image, is designated as an LL0 plane. The LL0 plane is handled as the low-frequency subband with the highest resolution as well as the wavelet transformation coefficient low-frequency subband LL1, LL2, LL3, LL4 and LL5.

More specifically, the five-stage wavelet transformation is executed sequentially as indicated below by using the expressions presented earlier. In the embodiment, the wavelet transformation is executed as noise signals are extracted sequentially by using the LL component data and the LH, HL and HH component data generated at the individual stages, as described later. It is to be noted that LL component data are low-frequency subband data, whereas the LH, HL and HH data are high-frequency subband data. Also, a low-frequency subband may be referred to as a low-frequency image and a high-frequency subband may be referred to as a high-frequency image. Furthermore, each subband may be referred to as a frequency band-limited image. A low-frequency subband is an image with band limits imposed upon the frequency bands of the original image toward the low-frequency side, whereas a high-frequency subband is an image with band limits imposed upon the frequency band of the original image toward the high-frequency side.

First-stage wavelet transformation: LL0 (real space)→LL1, LH1, HL1, HH1

Second-stage wavelet transformation: LL1→LL2, LH2, HL2, HH2

Third-stage wavelet transformation: LL2→LL3, LH3, HL3, HH3

Fourth stage wavelet transformation: LL3→LL4, LH4, HL4, HH4

Fifth-stage wavelet transformation: LL4→LL5, LH5, HL5, HH5

Figure 5:
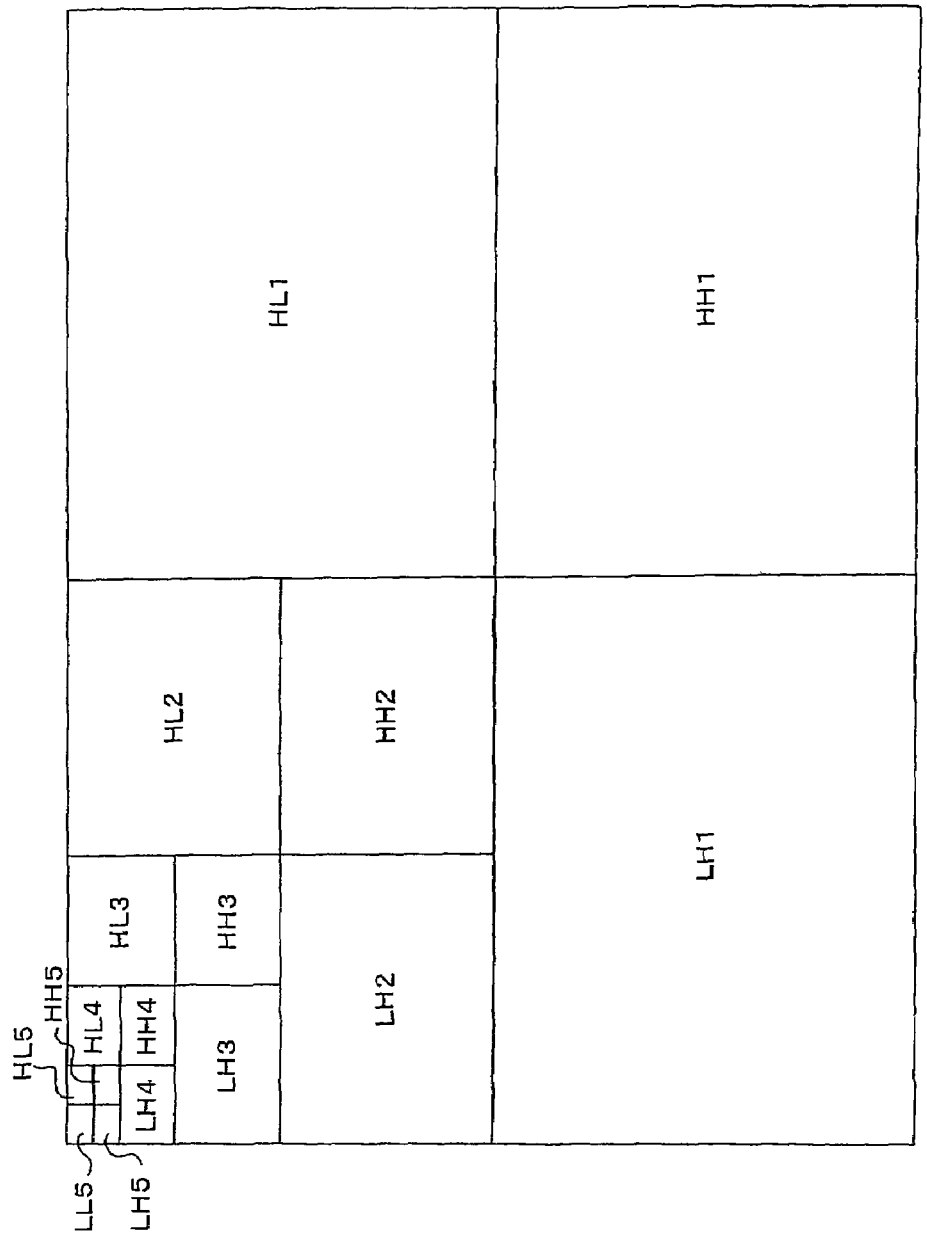

FIG. 5 shows the subband partition achieved through the five-stage wavelet transformation. For instance, through the first-stage wavelet transformation, high-pass component data and low-pass component data are extracted from the image data in all the rows extending along the horizontal direction in the real space. As a result, high-pass component data and low-pass component data corresponding to half the entire number of pixels are extracted along the horizontal direction. The extracted high-pass component data and low-pass component data may then be stored into, for instance, memory areas on the right side and on the left side of the memory area where the image data in the real space have been present.

Next, high-pass component data and low-pass component data are extracted as expressed earlier, individually from the high-pass component data having been stored on the right side in the memory area and from the low-pass component data having been stored on the left side in the memory area, along all the columns extending in the vertical direction. As a result, high-pass component data and low-pass component data are extracted both from the high-pass component data stored on the right side in the memory area and from the low-pass component data stored on the left side in the memory area. The high-pass component data and the low-pass component data thus extracted are stored on the bottom side and the top side respectively in the memory area where the corresponding source data have been present.

HH indicates data extracted as high-pass component data along the vertical direction from data having been extracted as high-pass component data along the horizontal direction, HL indicates data extracted as low-pass component data along the vertical direction from the data having been extracted as high-pass component data along the horizontal direction, LH indicates data extracted as high-pass component data along the vertical direction from data having been extracted as low-pass component data along the horizontal direction and LL indicates data extracted as low-pass component data along the vertical direction from the data having been extracted as low-pass component data along the horizontal direction. However, since the processing along the vertical direction and the processing along the horizontal direction are executed independently, the same processing results are obtained by extracting the data in the reverse order.

Next, through the second-stage wavelet transformation, high-pass component data and low-pass component data are extracted in a similar manner from the data LL extracted through the first-stage wavelet transformation as low-pass component data along the vertical direction from the data having been extracted as the low-pass component data along the horizontal direction. The partition shown in FIG. 5 is achieved by repeatedly executing the processing described above over five stages.

(2-1-2) Inverse Wavelet Transformation: Synthesis/Reconstruction Process

The inverse wavelet transformation (inverse multiple resolution transformation) is executed as expressed below.

$$x[2n]=s[n]-(d[n]+d[n-1])/4 \quad (11)$$

$$x[2n+1]=d[n]+(x[2n+2]+x[2n])/2 \quad (12)$$

It is to be noted that as shown in FIG. 3, a signal expressing the image is input to be used as the value x for the wavelet transformation, the noise components contained in the generated wavelet transformation coefficients s and d are extracted and a noise image x is generated by substituting the extracted noise components for s and d used in the inverse wavelet transformation.

(2-2) Noise Removal Processing

Any noise removal filter may be used in the noise removal processing executed on the individual subband planes. Typical examples of edge-preserving smoothing filters include a filters such as that described in reference "Jong—Sen Lee, "Digital image smoothing and the Sigma filter", Computer Vision, Graphics and Image Processing 24 (1983) pp 255~269" and bilateral filters such as that described in reference "C. Tomasi et al., "Bilateral Filtering for Gray and Color Images," Proceedings of the 1998 IEEE International Conference on Computer Vision, Bombay, India".

However, in this embodiment there are shown, for example, a higher performance modified bilateral filter (see Japanese Patent Application No. 2004-367263 submitted by the inventor of the present invention for details) and a simpler and faster noise removal filter (see Japanese Patent Application No. 2005-101545 submitted by the inventor of the present invention. The noise removal methods achieved through the use of this filter is to be referred to as a Laplacian noise extraction method). Either of these noise removal filters may be used.

V(vector r) represents an original signal in the input subband image plane whereas V'(vector r) or V"(vector r) represents a signal on an image plane having undergone noise removal. It is to be noted that r with an arrow (referred to as vector r) and r' with an arrow (referred to as vector r') in the expression below, each representing a vector, indicate two dimensional positional coordinates.

(2-2-1) Modified Bilateral Filter

[Expression 3]

$$V'(\vec{r}) = \frac{\int_{|\vec{r}'|<2r_{th}} V(\vec{r}')\exp\left\{-\frac{|V(\vec{r}')-V(\vec{r})|^2}{\sigma_{th}^2} \cdot \frac{|\vec{r}'-\vec{r}|^2}{r_{th}^2}\right\}d\vec{r}'}{\int_{|\vec{r}'|<2r_{th}} \exp\left\{-\frac{|V(\vec{r}')-V(\vec{r})|^2}{\sigma_{th}^2} \cdot \frac{|\vec{r}'-\vec{r}|^2}{r_{th}^2}\right\}d\vec{r}'} \quad (13)$$

The threshold value rth taken along the spatial direction should assume a value within a range of approximately 0.5~3.0 pixels so as to create an overlap of hierarchical layers with different resolutions, since the noise removal filter assumes a range approximately twice the threshold value. The threshold value may also be adjusted in correspondence to the image-capturing sensitivity. The threshold value σth taken along the gradation direction should assume a greater value as a higher image-capturing sensitivity level is selected and the optimal value should be adjusted in correspondence to each subband as well.

The filter weighting coefficient in the bilateral filter in the related art is represented by the product of the weighting coefficient w_photo [V'−V] of the photometric term that takes the difference (V'−V) between pixel values alone as an argument and the weighting coefficient w_geometric[r'−r] of the geometric term which takes the spatial distance (r'−r) alone as an argument. In this sense, the bilateral filter in the related art may be referred to as a separately weighted bilateral filter, the weighting coefficient of which can be separated into the photometric term and the geometric term. The weighting coefficient of the modified bilateral filter, on the other hand, cannot be separated into the photometric term and the geometric term. In other words, it is an integrated weighted bilateral filter, the weighting coefficient of which is expressed with a single exponential function, taking on an exponent assuming the value matching the product of the two arguments.

(2-2-2) Laplacian Noise Extraction Method

Noise is extracted from the chrominance component data as expressed below

[Expression 4]

$$V'(\vec{r})=V(\vec{r})-\nabla^2 V(\vec{r})\cdot f(\nabla^2 V(\vec{r})) \quad (14)$$

Noise is extracted from the luminance component data as expressed below

[Expression 5]

$$V'(\vec{r})=V(\vec{r})-\nabla^2 V(\vec{r})\cdot f(\nabla^2 V(\vec{r})) \quad (15)$$

$$V''(\vec{r})=V'(\vec{r})+\nabla^2 V'(\vec{r})\cdot f(\nabla^2 V'(\vec{r})) \quad (16)$$

$f(x)$ is a function expressed below. $\nabla^2$ represents the Laplacian filter (high-pass filter). FIG. 6 shows the simplest Laplacian filter in common use.

[Expression 6]

$$f(x) = \exp\left(-\frac{x^2}{\sigma_{th}^2}\right) \quad (17)$$

It is to be noted that the threshold value σth taken along the gradation direction should be set based upon a concept similar to that applied to the modified bilateral filter detailed above. It will be obvious that individually selected optimal values should be set as the threshold value for the luminance component data and the chrominance component data.

It is to be noted that the modified bilateral filter and the Laplacian filter described above are each a function of the values of signals contained in localized areas. Namely, noise is extracted by checking the values indicated in the signals in the individual localized areas in the low-frequency subband and the high-frequency subbands.

(2-3) Noise Removal from the Luminance Component (L^)

Next, in reference to FIG. 3, the noise removal from the luminance component data (L^) is described in detail. As explained earlier, the noise is extracted through the "sequential analysis". It is to be noted that the individual processing phases (x-x) described below are indicated as (x-x) in correspondence in FIG. 3.

(2-3-1) Multiple Resolution Transformation and Sequential Noise Extraction (2-3-1-1) Processing at the Highest Resolution in the Real Space In processing (0-1), noise is removed from an image signal S0(LL0) in the real space through the noise removal filter described above, so as to generate a noise-free image signal S0'(LL0). In processing (0-2), the noise component in the LL0 subband is extracted as expressed; n0(LL0)=S0(LL0)−S0'(LL0). In processing (0-3), the noise signal n0(LL0) retaining the initial intensity (or multiplied by a factor of $\alpha(0)$) is subtracted from the image signal S0(LL0), thereby removing the noise from S0(LL0). It is to be noted that $0<\alpha(0)\leq 1$ and that $\alpha(0)$ normally takes on the value of 1. In processing (0-4), the image signal in the LL0 plane, having undergone noise removal through the processing (0-3), undergoes wavelet transformation, thereby generating image signals S1(LL1, LH1, HL1, HH1) at ½ resolution.

(2-3-1-2) Processing Executed at ½ Resolution

In processing (1-1), noise is removed from the individual image signals S1(LL1, LH1, HL1, HH1) via the noise removal filter described above and, as a result, noise-free image signals S1'(LL1, LH1, HL1, HH1) are generated. In processing (1-2), the noise components in the individual subbands are extracted as expressed; n1(LL1)=S1(LL1)−S1'(LL1), n1(LH1)=S1(LH1)−S1'(LH1), n1(HL1)=S1(HL1)−S1'(HL1) and n1(HH1)=S1(HH1)−S1'(HH1). In processing (1-3), the noise signal n1(LL1) retaining the initial intensity (or multiplied by a factor of $\alpha(1)$) is subtracted from the image signal S1(LL1), thereby removing the noise from S1(LL1). It is to be noted that $0<\alpha(1)\leq 1$ and that $\alpha(1)$ normally takes on the value of 1. In processing (1-4), the image signal in the LL1 plane, having undergone noise removal through the processing (1-3), undergoes wavelet transformation, thereby generating image signals S2(LL2, LH2, HL2, HH2) at ¼ resolution.

(2-3-1-3) Processing Executed at ¼ Resolution

This processing is executed much the same way as the processing executed at the ½ resolution described in (2-3-1-2) above.

(2-3-1-4) Processing Executed at ⅛ Resolution

This processing is executed much the same way as the processing executed at the ½ resolution described in (2-3-1-2) above.

(2-3-1-5) Processing Executed at 1/16 Resolution

In processing (4-1), noise is removed from the individual image signals S4(LL4, LH4, HL4, HH4) via the noise removal filter described above and, as a result, noise-free image signals S4'(LL4, LH4, HL4, HH4) are generated. In processing (4-2), the noise components in the individual subbands are extracted as expressed; n4(LL4)=S4(LL4)−S4'(LL4), n4(LH4)=S4(LH4)−S4'(LH4), n4(HL4)=S4(HL4)−S4'(HL4) and n4(HH4)=S4(HH4)−S4'(HH4). In processing (4-3), the noise signal n4(LL4) retaining the initial intensity (or multiplied by a factor of $\alpha(4)$) is subtracted from the image signal S4(LL4), thereby removing the noise from S4(LL4). It is to be noted that $0<\alpha(4)\leq 1$ and that $\alpha(4)$ normally takes on the value of 1. In processing (4-4), the image signal in the LL4 plane, having undergone noise removal through the processing (4-3), undergoes wavelet transformation, thereby generating image signals S5(LL5, LH5, HL5, HH5) at 1/32 resolution.

(2-3-1-6) Processing Executed at 1/32 Resolution, i.e., the Lowest Resolution

In processing (5-1), noise is removed from the individual image signals S5(LL5, LH5, HL5, HH5) via the noise removal filter described above and, as a result, noise-free image signals S5'(LL5, LH5, HL5, HH5) are generated. In processing (5-2), the noise components in the individual subbands are extracted as expressed; n5(LL5)=S5(LL5)−S5'(LL5), n5(LH5)=S5(LH5)−S5'(LH5), n5(HL5)=S5(HL5)−S5'(HL5) and n5(HH4)=S5(HH5)−S5'(HH5).

The processing described above differs from the related art in that the noise components in the high-frequency subbands LH, HL and HH on the low-resolution side generated from a low-frequency subband LL having undergone the sequential noise removal, too, are extracted with a high level of accuracy after the subbands data first undergo the high-resolution-side noise removal. Namely, the results of the noise removal executed on an upper layer low-frequency subband affect noise extraction from the lower layer high-frequency subbands as well as the lower layer low-frequency subband. Thus, the noise components can be extracted both from the low-frequency subband and the high-frequency subbands, containing very little residual noise to begin with, in the multiple-resolution representations.

(2-3-2) Noise Component Frequency Characteristics Adjustment

Next, the extracted noise components are modified into noise components to be used for the actual noise removal. This modification is achieved by re-extracting noise components for the actual noise removal from the extracted noise components. This process, executed to assure the indestructibly of the luminance component image structure, fulfills the role of a variable parameter with which the visual effect achieved through noise removal can be adjusted with ease. Namely, the noise component frequency characteristics are adjusted by altering the weight applied to the low-frequency subband (LL) and the high-frequency subbands (LH, HL, HH) relative to each other. The parameter may be provided as a graininess-modifying parameter for the noise removal in a graphic user interface in software processing or the like. In other words, different weighting coefficients are applied to the noise component in a low-frequency subband and the noise components in the high-frequency subbands (e.g., k0 applied to the LL subband and 1 applied to the other subbands in the example presented below, so as to modulate the weights applied to different noise component frequency bands.

This process is executed as expressed below and the individual processing procedures correspond to the processing (0-5), the processing (1-5), the processing (2-5), the processing (3-5), the processing (4-5) and the processing (5-5) in FIG. 3.

$$n0'(LL0)=k0(0)*n0(LL0) \qquad (18)$$

$$n1'(LL1)=k0(1)*n1(LL1) \qquad (19)$$

$$n2'(LL2)=k0(2)*n2(LL2) \qquad (20)$$

$$n3'(LL3)=k0(3)*n3(LL3) \qquad (21)$$

$$n4'(LL4)=k0(4)*n4(LL4) \qquad (22)$$

$$n5'(LL5)=k0(5)*n5(LL5) \qquad (23)$$

During the processing, the following measures are taken.
n1'(LL1) and n1(LH1, HL1, HH1) are directly bundled together into n1'(LL1, LH1, HL1, HH1).
n2'(LL2) and n2(LH2, HL2, HH2) are directly bundled together into n2'(LL2, LH2, HL2, HH2).
n3'(LL3) and n3(LH3, HL3, HH3) are directly bundled together into n3'(LL3, LH3, HL3, HH3).
n4'(LL4) and n4(LH4, HL4, HH4) are directly bundled together into n4'(LL4, LH4, HL4, HH4).

n5'(LL5) and n5(LH5, HL5, HH5) are directly bundled together into n5'(LL5, LH5, HL5, HH5).

Under normal circumstances, k0(0), k0(1), k0(2), k0(3), k0(4) and k0(5) are all set equal to one another at k0, which is variable within a range of $0 \leq k0 \leq 1$. k0 should assume a value close to the median value, e.g., 0.5, in order to prevent manifestation of significant residual noise components and also preserve textural structure in the image by retaining the optimal level of graininess, whereas a lower value such as 0.2 may be assumed for k0 if it is more important to preserve the image structure by sustaining a higher level of graininess. If, on the other hand, the wide range high-frequency background noise over the entire image plane needs to be eliminated, a higher value, e.g., 0.8, should be assumed for k0.

The noise signal in a high-frequency subband sustaining the initial intensity should be directly output under normal circumstances. In other words, the weight applied to the high-frequency subbands should be set to a greater value than the weight applied to the low-frequency subband. However, under certain circumstances, the high-frequency subbands noise signal may be multiplied by a weighting coefficient. FIG. 7 shows the weighting coefficients applied to the low-frequency subband (LL) and the high-frequency subbands (LH, HL, HH).

As described above, the present invention adopts the noise removal concept that assumes two different types of noise removal, i.e., the noise removal executed for noise component extraction and the noise removal executed for actual noise removal during which the image structure must remain intact. Noise removal for noise extraction can be executed with as much intensity, as needed, unrestricted by the conditions imposed to assure image structure preservation. Namely, the intensity with which noise is removed for noise component extraction can be increased freely, unlike the intensity with which the noise removal for actual noise removal is executed. Consequently, noise can be extracted accurately from each subband while assuring a satisfactory level of image structure preservation.

In addition, the frequency characteristics of the synthesized noise component can be adjusted with ease simply by applying a weighting coefficient to a complementary subband among the high-frequency subbands and the low-frequency subband. Thus, an environment in which the visual effect achieved through noise removal can be adjusted with ease while assuring fine noise removal is created. In addition, since the need to re-execute the noise removal processing for noise extraction, which is normally the most time-consuming, is eliminated, the results achieved by adjusting the visual effect can be obtained promptly.

(2-3-3)

Synthesis of Noise Components

The modified noise components are then synthesized through inverse wavelet transformation executed in sequence from the lowest resolution side.

(2-3-3-1) Processing Executed at 1/32 Resolution, i.e., the Lowest Resolution

In processing (5-7), the noise signals n5'(LL5, LH5, HL5, HH5) corresponding to the single layer, having undergone the inter-band weighting processing, undergo inverse wavelet transformation, so as to generate a noise signal N5(LL4) corresponding to the LL4 subband plane.

(2-3-3-2) Processing Executed at 1/16 Resolution

In processing (4-6), the noise signal n4'(LL4) having been extracted from the LL4 subband plane and having undergone the weighting processing, is combined with N5(LL4) through addition processing expressed as below $$n4''(LL4)=n4'(LL4)+N5(LL4) \quad (24).$$

n4''(LL4) and n4'(LH4, HL4, HH4) are directly bundled together into n4''(LL4, LH4, HL4, HH4). Through this processing, the noise component corresponding to the LL4 plane is generated by combining the noise components over the two layers, as indicated in FIG. 3. It is to be noted, however, that the noise components for LH4, HL4 and HH4 correspond to a single layer. In processing (4-7), the noise signals n4''(LL4, LH4, HL4, HH4) obtained by combining the noise components over the two layers, undergo inverse wavelet transformation, so as to generate a noise signal N4(LL3) corresponding to the LL3 subband plane.

(2-3-3-3) Processing Executed at 1/8 Resolution

This processing is executed in much the same way as the "processing executed at 1/16 resolution" described in (2-3-3-2) above.

(2-3-3-4) Processing Executed at 1/4 Resolution

This processing is executed in much the same way as the "processing executed at 1/16 resolution" described in (2-3-3-2) above.

(2-3-3-5) Processing Executed at 1/2 Resolution

In processing (1-6), the noise signal n1'(LL1) having been extracted from the LL1 subband plane and having undergone the weighting processing, is combined with N2(LL1) through addition processing expressed as below.

$$n1''(LL1)=n1'(LL1)+N2(LL1) \quad (25)$$

n1''(LL1) and n1'(LH1, HL1, HH1) are directly bundled together into n1''(LL1, LH1, HL1, HH1). In processing (1-7), the noise signals n''(LL1, LH1, HL1, HH1) obtained by combining the noise components over the two layers, undergo inverse wavelet transformation, so as to generate a noise signal N1(LL0) corresponding to the LL0 subband plane.

(2-3-3-6) Processing Executed at the Highest Resolution in the Real Space

In processing (0-6), the noise signal n0'(LL0) having been extracted from the LL0 subband plane and having undergone the weighting processing, is combined with N1(LL0) through addition processing expressed as below.

$$n0''(LL0)=n0'(LL0)+N1(LL0) \quad (26).$$

It is to be noted that the processing according to the present invention described above differs from the related art in that the noise component for the low-frequency subband is generated through noise synthesis by combining the noise components over two layers, i.e., the noise component obtained by synthesizing the noise components in the low-frequency subband and the high-frequency subbands on the low resolution side and the noise component extracted from the low-frequency subband at the target resolution are combined. Through these measures, the correct noise component minus any residual noise component can be synthesized with ease, while assuring a high level of image structure preservation and noise characteristics that allow the visual effect to be adjusted easily.

The adjustability of the frequency characteristics may be further increased by selecting different levels of intensity for the noise components in the varying resolution levels when adding together the noise components over the two layers. Under such circumstances, the processing should be executed as expressed below.

$$n4''(LL4)=n4'(LL4)+\beta(5)*N5(LL4) \quad (27)$$

$$n3''(LL3)=n3'(LL3)+\beta(4)*N4(LL3) \quad (28)$$

$$n2''(LL2)=n2'(LL2)+\beta(3)*N3(LL2) \quad (29)$$

$$n1''(LL1)=n1'(LL1)+\beta(2)*N2(LL1) \quad (30)$$

$$n0''(LL0)=n0'(LL0)+\beta(1)*N1(LL0) \quad (31)$$

It is to be noted that $0<\beta(1)\leq 1$, $0<\beta(2)\leq 1$, $0<\beta(3)\leq 1$, $0<\beta(4)\leq 1$ and $0<\beta(5)\leq 1$. The use of such a parameter may prove effective when, for instance, random noise cannot be assumed to be white noise, which remains uniform over the full frequency range.

(2-3-4) Actual Noise Removal Processing

The actual noise removal is executed on the single synthesized noise component with the resolution matching that in the real space, to which a noise removal factor, i.e., a weighting coefficient parameter $\lambda$, has been applied so as to adjust the extent of noise removal for the overall image. Namely, the processing is executed as expressed below.

$$S0NR(LL0)=S0(LL0)-\lambda*n0''(LL0) \quad (32)$$

with parameter $\lambda$ assuming value within the range of $0\leq\lambda\leq 1$.

(2-4) Noise Removal from the Chrominance Component ($\hat{a}$).

As does the luminance component data ($\hat{L}$), the chrominance component data ($\hat{a}$) undergoes noise extraction through the "sequential analysis". The noise removal processing executed for the chrominance component differs from the noise removal from the luminance component in that the weighting coefficients are applied to different target subbands in order to modify the frequency characteristics from the target subbands in the processing executed to adjust the noise component frequency characteristics described in (2-3-2) above, i.e., different weighting processing is executed and in that the noise removal factor parameter is selected differently from the noise removal factor parameter set in the "Actual noise removal processing" described in (2-3-4) above. The following explanation focuses on these differences. It is to be noted that FIG. 4 only shows the part of the "noise component frequency characteristics adjustment" processing that is different from the processing shown in FIG. 3.

(2-4-1) Noise Component Frequency Characteristics Adjustment

As expressed below, a weighting coefficient parameter used to assure both a desirable point-like noise removal effect and color retention when actually removing noise from the chrominance component data is applied to the noise components in the high-frequency subbands (LH, HL, HH), since the low-frequency subband is assigned as a primary band and the high-frequency subbands are assigned as complementary bands in the case of the chrominance component data.

$$n1'(LH1)=k1(1)*n1(LH1) \quad (33)$$

$$n1'(HL1)=k1(1)*n1(HL1) \quad (34)$$

$$n1'(HH1)=k2(1)*n1(HH1) \quad (35)$$

$$n2'(LH2)=k1(2)*n2(LH2) \quad (36)$$

$$n2'(HL2)=k1(2)*n2(HL2) \quad (37)$$

$$n2'(HH2)=k2(2)*n2(HH2) \quad (38)$$

$$n3'(LH3)=k1(3)*n3(LH3) \quad (39)$$

$$n3'(HL3)=k1(3)*n3(HL3) \quad (40)$$

$$n3'(HH3)=k2(3)*n3(HH3) \quad (41)$$

$$n4'(LH4)=k1(4)*n4(LH4) \quad (42)$$

$$n4'(HL4)=k1(4)*n4(HL4) \quad (43)$$

$$n4'(HH4)=k2(4)*n4(HH4) \quad (44)$$

$$n5'(LH5)=k1(5)*n5(LH5) \quad (45)$$

$$n5'(HL5)=k1(5)*n5(HL5) \quad (46)$$

$$n5'(HH5)=k2(5)*n5(HH5) \quad (47)$$

During the processing, the following measures are taken.

n1(LL1) and n1'(LH1, HL1, HH1) are directly bundled together into n1'(LL1, LH1, HL1, HH1).

n2(LL2) and n2'(LH2, HL2, HH2) are directly bundled together into n2'(LL2, LH2, HL2, HH2).

n3(LL3) and n3'(LH3, HL3, HH3) are directly bundled together into n3'(LL3, LH3, HL3, HH3).

n4(LL4) and n4'(LH4, HL4, HH4) are directly bundled together into n4'(LL4, LH4, HL4, HH4).

n5(LL5) and n5'(LH5, HL5, HH5) are directly bundled together into n5'(LL5, LH5, HL5, HH5).

Under normal circumstances, k1(1), k1(2), k1(3), k1(4) and k1(5) are all set equal to one another at k1 and k2(1), k1(2), k2(3), k2(4) and k2(5) are all set equal to one another at k2. k1 and k2 are variable within a range of $0\leq k1$, $k2\leq 1$ and may be set to, for instance, k1=0.9 and k2=0.8. Under normal operating conditions, they should both be set to values within a range of 0.8~1.0. In addition, while k1 is commonly set for the LH subband and the HL subband, different values may be selected for the LH subband and the HL subband instead. FIG. 8 shows the weighting coefficients applied to the low-frequency subband (LL) and the high-frequency subbands (LH, HL, HH). The weighting coefficient applied to the low-frequency subband (LL) is 1 and accordingly, the value initially assumed in the noise signal is directly used. In other words, the weight applied to the low-frequency subband should be set to a greater value than the weights applied to the high-frequency subbands. However, the weights applied to the low-frequency subband and the high-frequency subbands are very nearly the same, as k1 is set to 0.9 and k2 is set to 0.8, both close to 1.

(2-4-2) Actual Noise Removal Processing

The actual noise removal processing for the chrominance component data is executed much the same way as the actual noise removal processing executed for the luminance component data ($\hat{L}$) described in (2-3-4). However, the noise removal factor $\lambda$ set for the chrominance component may assume the value of 1.0 under normal circumstances.

By taking full advantage of the characteristics of the multi-channel representation as described above, the noise extraction processing is executed in the optimal frequency spaces where the noise components can be extracted with ease, based upon the difference of the image structures and the difference of the noise characteristics between separated luminance and chrominance planes. As a result, fine noise removal from a color image is achieved with ease while assuring a minimum loss of image structures and minimum residual noise.

(2-5) Noise Removal from the Chrominance Component ($\hat{b}$)

The noise removal for the chrominance component ($\hat{b}$) is executed in much the same way as the noise removal for the chrominance component ($\hat{a}$) described in (2-4).

The following three different functions are fulfilled via the main noise removal parameters that can be adjusted by the user with ease in software or the like.

(1) An intensity parameter (intensity) used for noise component extraction: σth (rth as well, in some filters)

(2) A frequency characteristics adjustment parameter (graininess) related to the noise graininess: k0

(3) A parameter (sharpness) related to the noise removal intensity: λ

Figure 9A:
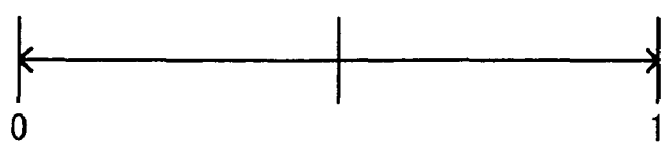
Figure 9B:
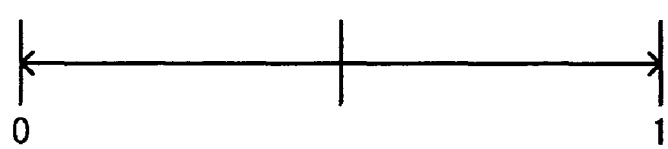
Figure 9C:
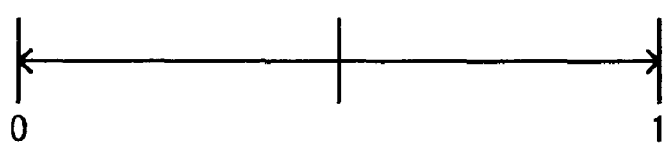

FIGS. 9A-9C show a setting screen that may be brought up to allow the user to set the intensity parameters (intensity) σth and rth, the frequency characteristics adjustment parameter (graininess) k0 and the noise removal intensity parameter (sharpness) λ. A slide bar is displayed in correspondence to each parameter so as to allow the user to select a preferred value for a given parameter by setting the pointer in the slide bar to a specific position.

More specifically, the setting screen in FIGS. 9A-9C is brought up on display at the monitor (not shown) of the personal computer 1 and the user sets the pointer in each slide bar to a specific position via a keyboard (not shown) or a mouse (not shown). The user is thus able to set the parameters with ease. For instance, the user may adjust the frequency characteristics adjustment parameter (graininess) k0 as explained earlier, so as to alter the visual effect to be achieved through noise removal with ease while preserving fine image characteristics. In addition, the operation will be executed in quick response as soon as k0 and λ are changed.

(3) Reverse Color Space Conversion, Image Data Output

In step S4 in FIG. 2, the image data resulting from the noise removal processing executed in step S3 described above undergo conversion processing which is the reverse of "(1) color space conversion" having been executed in step S2 so as to convert the image data back to data constituting an RGB image. In step S5, the image data constituting the RGB image resulting from the reverse conversion are output.

As described above, in the first embodiment, two types of processing equivalent to two different types of noise removal, are executed each for noise extraction or noise removal, and the noise removal results obtained by removing noise from an upper layer low-frequency subband are made to affect the noise extraction from the lower layer high-frequency subbands as well as the noise extraction from the lower layer low-frequency subband. Namely, noise is extracted sequentially from both the high-frequency subbands and the low-frequency subband constituting images obtained through multiple resolution transformation while allowing the processing of either type of subbands to be influenced by the characteristics of the other type of subbands. Consequently, the level of freedom with which different frequency bands can be combined in the processing increases and the noise extraction can be executed in the frequency space optimized for the noise extraction. This means that fine noise removal is enabled without loss of image structure while minimizing the residual noise that is not extracted.

Namely, fine noise removal processing (edge-preserving smoothing) assuring a high level of image structure preservation while effectively addressing the issue of residual noise in a regular image such as a digital picture, is realized through the embodiment.

Figure 16:
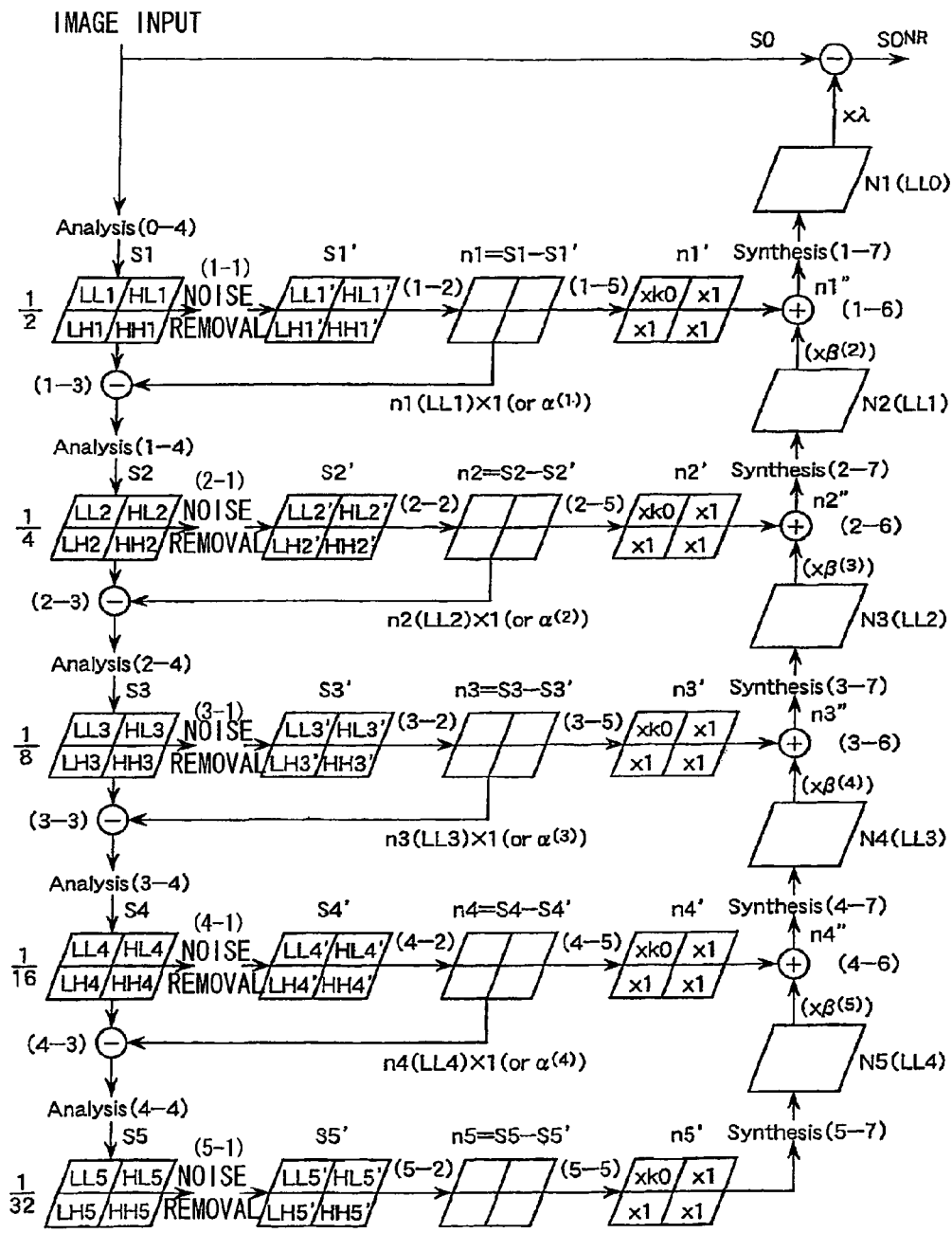

It is to be noted that in the embodiment, a specific type of noise removal processing is executed on the image signal S0(LL0) in the real space (see FIG. 3). However, a load of the processing executed on the image signal S0(LL0) in the real space is bound to be extremely heavy. Even through the processing executed at lower resolutions equal to or lower than that corresponding to the image signals S1(LL1, LH1, HL1, HH1) in the embodiment alone, a sufficient level of fine noise removal processing is achieved. Accordingly, the specific noise removal processing executed on the image signal S0(LL0) in the real space may be skipped. FIG. 16 presents a flowchart of the processing executed on the luminance component (luminance signal) by skipping the specific noise removal processing on the image signal S0(LL0) in the real space in FIG. 3. The chrominance components, too, may be processed in a similar manner. Through these measures, fine noise removal processing can be executed with a lighter processing load.

Second Embodiment

In reference to the first embodiment, a method that may be adopted in a "sequential analysis" whereby noise is extracted sequentially as the image data at a higher resolution are decomposed to data at a lower resolution. Now, in reference to the second embodiment, a method that may be adopted in a "sequential synthesis" whereby noise is extracted sequentially as data having been analyzed through multiple resolution transformation are integrated so as to synthesize image data toward the higher resolution is explained.

Since the image processing apparatus in the second embodiment assumes a structure similar to that of the image processing apparatus in the first embodiment illustrated in FIG. 1, its explanation is omitted. In addition, the overall flow of the image processing executed by the personal computer 1 in the second embodiment, too, is similar to that in the flowchart presented in FIG. 2 and, accordingly, its explanation is omitted. The following explanation focuses on the aspects of the second embodiment that differ from those of the processing executed in the first embodiment.

(1) Color Space Conversion
(2) Noise Removal
(2-1) Multiple Resolution Transformation
(2-1-1) Wavelet Transformation: Analysis/Decomposition Process
(2-1-2) Inverse Wavelet Transformation: Synthesis/Reconstruction Process
(2-2) Noise Removal Processing
(2-2-1) Modified Bilateral Filter
(2-2-2) Laplacian Noise Extraction Since details of the processes listed above are similar to those in the first embodiment, their explanation is omitted.

(2-3) Noise Removal from the Luminance Component (L^)

Figure 10:
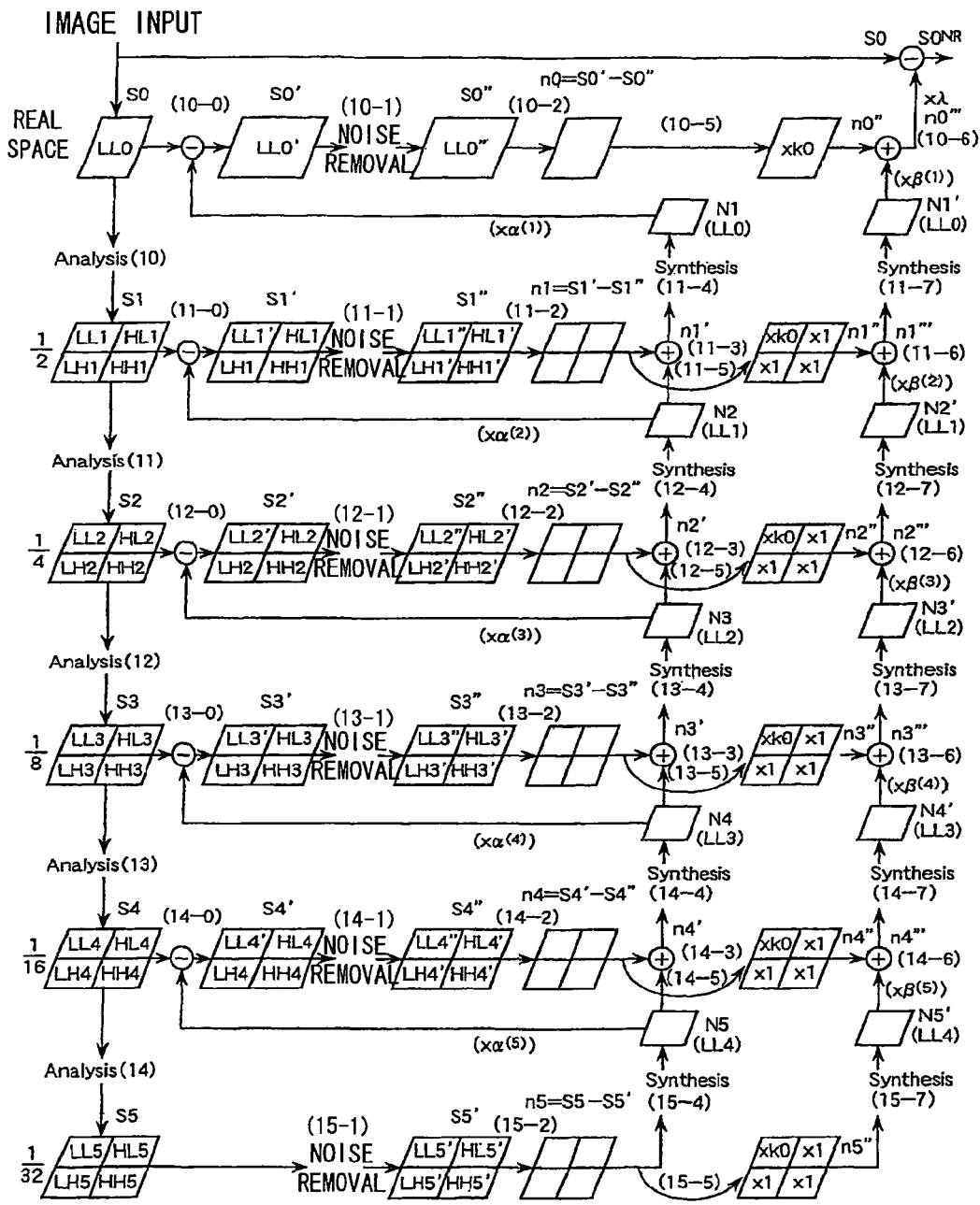

FIG. 10 presents a flowchart of the processing executed for luminance component data, whereas FIG. 11 presents a flowchart of the processing executed for chrominance component data. It is to be noted that FIG. 11 simply shows the part of the chrominance component processing that is different from the luminance component processing in FIG. 10. It is also to be noted that the individual processing phases (xx) and (xx-x) described below are also indicated as (xx) and (xx-x) in FIG. 10.

(2-3-1) Multiple Resolution Transformation
(2-3-1-1) Processing Executed at the Highest Resolution in the Real Space In processing (10), the image signal S0(LL0) on the real space plane undergoes wavelet transformation so as to generate image signals S1(LL1, LH1, HL1, HH1) at ½ resolution.

(2-3-1-2) Processing Executed at ½ Resolution

In processing (11), the image signal S1(LL1) on the LL1 plane undergoes wavelet transformation so as to generate image signals S1(LL2, LH2, HL2, HH2) at ¼ resolution.

(2-3-1-3) Processing Executed at ¼ Resolution

In processing (12), the image signal S2(LL2) on the LL2 plane undergoes wavelet transformation so as to generate image signals S3(LL3, LH3, HL3, HH3) at ⅛ resolution.

(2-3-1-4) Processing Executed at ⅛ Resolution

In processing (13), the image signal S3(LL3) on the LL3 plane undergoes wavelet transformation so as to generate image signals S4(LL4, LH4, HL4, HH4) at 1/16 resolution.

(2-3-1-5) Processing Executed at 1/16 Resolution

In processing (14), the image signal S4(LL4) on the LL4 plane undergoes wavelet transformation so as to generate image signals S5(LL5, LH5, HL5, HH5) at 1/32 resolution.

(2-3-2) Sequential Noise Extraction (2-3-2-1) Processing Executed at 1/32 Resolution i.e., at the Lowest Resolution In processing (15-1), noise is removed from the individual image signals S5(LL5, LH5, HL5, HH5) and, as a result, noise-free image signals S5'(LL5, LH5, HL5, HH5) aregenerated. In processing (15-2), the noise signals in the individual subbands are extracted as expressed; n5(LL5)=S5(LL5)−S5'(LL5), n5(LH5)=S5(LH5)−S5'(LH5), n5(HL5)=S5(HL5)−S5'(HL5) and n5(HH5)=S5(HH5)−S5'(HH5). In processing (15-4) the noise signals n5(LL5, LH5, HL5, HH5) undergo inverse wavelet transformation (synthesis), thereby generating a noise signal N5(LL4) to be used for noise extraction in correspondence to the LL4 subband plane.

(2-3-2-2) Processing Executed at 1/16 Resolution

In processing (14-0), the noise signal N5(LL4) retaining the initial intensity (or multiplied by a factor of α(5)) is subtracted from the image signal S4(LL4), so as to obtain an image signal S4'(LL4). It is to be noted that $0<\alpha(5)\leq 1$ and that α(5) normally takes on the value of 1. It is to be noted that S4'(LL4) and S4(LH4, HL4, HH4) are directly bundled together into S4'(LL4, LH4, HL4, HH4).

In processing (14-1), noise is removed from the individual image signals S4'(LL4, LH4, HL4, HH4) and, as a result, noise-free image signals S4''(LL4, LH4, HL4, HH4) are generated while these signals are indicated as S4''(LL4'', LH4', HL4', HH4') in FIG. 10, they are identical to S4''(LL4, LH4, HL4, HH4). In processing (14-2), the noise signals in the individual subbands are extracted as expressed; n4(LL4)=S4'(LL4)−S4''(LL4), n4(LH4)=S4'(LH4)−S4''(LH4), n4(HL4)=S4'(HL4)−S4''(HL4) and S4' n4(HH4)=S4'(HH4)−S4''(HH4).

In processing (14-3), the noise signal n4(LL4) extracted through the noise removal processing executed for the LL4 plane and the noise signal N5(LL4) obtained by synthesizing the noise components from the lower layer for noise extraction are combined through addition processing executed as expressed below.

$$n4'(LL4)=n4(LL4)+N5(LL4) \quad (48)$$

n4'(LL4) and n4(LH4, HL4, HH4) are directly bundled together into n4'(LL4, LH4, HL4, HH4). In processing (14-4), the noise signals n4'(LL4, LH4, HL4, HH4) undergo inverse wavelet transformation to generate a noise signal N4(LL3) corresponding to the LL3 subband plane.

(2-3-2-3) Processing Executed at 1/8 Resolution

This processing is executed much the same way as the processing executed at the 1/16 resolution, as described in (2-3-2-2) above.

(2-3-2-4) Processing Executed at 1/4 Resolution

This processing is executed much the same way as the processing executed at the 1/16 resolution, as described in (2-3-2-2) above.

(2-3-2-5) Processing Executed at 1/2 Resolution

In processing (11-0), the noise signal N2(LL1) retaining the initial intensity (or multiplied by a factor of α(2)) is subtracted from the image signal S1(LL1), so as to obtain an image signal S1'(LL1). It is to be noted that $0<\alpha(2)\leq 1$ and that α(2) normally takes on the value of 1. It is also to be noted that S1'(LL1) and S1(LH1, HL1, HH1) are directly bundled together into S1'(LL1, LH1, HL1, HH1).

In processing (11-1), noise is removed from the individual image signals S1'(LL1, LH1, HL1, HH1) and, as a result, noise-free image signals S1''(LL1, LH1, HL1, HH1) are generated while these signals are indicated as S1''(LL1'', LH1', HL1', HH1') in FIG. 10, they are identical to S1''(LL1, LH1, HL1, HH1). In processing (11-2), the noise signals in the individual subbands are extracted as expressed; n1(LL1)=S1'(LL1)−S1''(LL1), n1(LH1)=S1'(LH1)−S1''(LH1), n1(HL1)=S1'(HL1)−S1''(HL1) and n1(HH1)=S1'(HH1)−S1''(HH1).

In processing (11-3), the noise signal n1(LL1) extracted through the noise removal processing executed for the LL1 plane and the noise signal N2(LL1) obtained by synthesizing the noise components from the lower layer for noise extraction are combined through addition processing executed as expressed below.

$$n1'(LL1)=n1(LL1)+N2(LL1) \quad (49)$$

n1'(LL1) and n1(LH1, HL1, HH1) are directly bundled together into n1'(LL1, LH1, HL1, HH1). In processing (11-4), the noise signals n1'(LL1, LH1, HL1, HH1) undergo inverse wavelet transformation to generate a noise signal N1(LL0) corresponding to the LL0 subband plane.

(2-3-2-6) Processing Executed at the Highest Resolution in the Real Space

In processing (10-0), the noise signal N1(LL0) retaining the initial intensity (or multiplied by a factor of α(1)) is subtracted from the image signal S0(LL0), so as to obtain an image signal S0'(LL0). It is to be noted that $0<\alpha(1)\leq 1$ and that α(1) normally takes on the value of 1. In processing (10-1), noise is removed from the individual image signal S0'(LL0) and, as a result, a noise-free image signal S0''(LL0) is generated. In processing (10-2), the noise signal is extracted as expressed; n0(LL0)=S0'(LL0)−S0''(LL0).

The feature of the embodiment that is particularly noteworthy is that the effect of the noise removal from the low resolution-side high-frequency subbands, as well as the effect of the noise removal from the low resolution side low-frequency subband is reflected in the execution of noise extraction from the higher resolution-side low-frequency subband. Namely, the results of noise removal from the lower layer low-frequency subband and the lower layer high-frequency subbands together affect the noise extraction from the upper layer low-frequency subband. Through these measures, the correct noise component that needs to be extracted from the low-frequency subband side in the multiple-resolution representations can be extracted, and thus, a noise component without significant residual noise is extracted.

By adopting such a "sequential synthesis" when processing the luminance component data in particular, the noise removal effect achieved on the high-frequency subband side can be used to successfully draw out the residual noise component manifesting as streaks or checkered patterns in the low-frequency side subband.

(2-3-3) Noise Component Frequency Characteristics Adjustment

Next, the extracted noise components are modified into noise components to be used for the actual noise removal. Namely, the noise component frequency characteristics are adjusted by selecting different setting for the weight applied to the low-frequency subband (LL) and the weight applied to the high-frequency subbands (LH, HL, HH). The noise component frequency characteristics are adjusted based upon a principal identical to that of the first embodiment and the parameter should be selected for the processing in the second embodiment in much the same way as in the first embodiment.

The processing is executed as expressed below and the individual processing procedures correspond to processing (10-5), processing (11-5), processing (12-5), processing (13-5), processing (14-5) and processing (15-5) in FIG. 10.

$$n0''(LL0)=k0(0)*n0(LL0) \quad (50)$$

$$n1''(LL1)=k0(1)*n1(LL1) \quad (51)$$

$$n2''(LL2)=k0(2)*n2(LL2) \quad (52)$$

$$n3''(LL3)=k0(3)*n3(LL3) \quad (53)$$

$$n4''(LL4)=k0(4)*n4(LL4) \quad (54)$$

$$n5''(LL5)=k0(5)*n5(LL5) \quad (55)$$

During the processing, the following measures are taken.
n1"(LL1) and n1(LH1, HL1, HH1) are directly bundled together into n1"(LL1, LH1, HL1, HH1).
n2"(LL2) and n2(LH2, HL2, HH2) are directly bundled together into n2"(LL2, LH2, HL2, HH2).
n3"(LL3) and n3(LH3, HL3, HH3) are directly bundled together into n3"(LL3, LH3, HL3, HH3).
n4"(LL4) and n4(LH4, HL4, HH4) are directly bundled together into n4"(LL4, LH4, HL4, HH4).
n5"(LL5) and n5(LH5, HL5, HH5) are directly bundled together into n5"(LL5, LH5, HL5, HH5).

(2-3-4) Synthesis of Noise Components

The modified noise components are then synthesized through inverse wavelet transformation executed in sequence from the lowest resolution side. The synthesized noise component is to be used for the actual noise removal.

(2-3-4-1) Processing Executed at 1/32 Resolution, i.e., the Lowest Resolution

In processing (15-7), the noise signals n5"(LL5, LH5, HL5, HH5) corresponding to the single layer, having undergone the inter-band weighting processing, undergo inverse wavelet transformation, so as to generate a noise signal N5'(LL4) to be used for the actual noise removal in correspondence to the LL4 subband plane.

(2-3-4-2) Processing Executed at 1/16 Resolution

In processing (14-6), the noise signal n4"(LL4) having been extracted from the LL4 subband plane and having undergone the weighting processing, is combined with noise signal N5'(LL4) obtained by synthesizing the noise components in the lower layer for actual noise removal through addition processing expressed as below.

$$n4'''(LL4)=n4''(LL4)+N5'(LL4) \quad (56)$$

n4'''(LL4) and n4"(LH4, HL4, HH4) are directly bundled together into n4'''(LL4, LH4, HL4, HH4). Through this processing, the noise component corresponding to the LL4 plane is generated by combining the noise components over the two layers, as indicated in FIG. 10. It is to be noted, however, that the noise components for LH4, HL4 and HH4 correspond to a single layer. In processing (14-7), the noise signals n4''' (LL4, LH4, HL4, HH4), obtained by combining the noise components over the two layers, undergo inverse wavelet transformation, so as to generate a noise signal N4'(LL3) corresponding to the LL3 subband plane.

(2-3-4-3) Processing Executed at 1/8 Resolution

This processing is executed in much the same way as the "processing executed at 1/16 resolution" described in (2-3-4-2) above.

(2-3-4-4) Processing Executed at 1/4 Resolution

This processing is executed in much the same way as the "processing executed at 1/16 resolution" described in (2-3-4-2) above.

(2-3-4-5) Processing Executed at 1/2 Resolution

In processing (11-6), the noise signal n1"(LL1) having been extracted from the LL1 subband plane and having undergone the weighting processing, is combined with N2'(LL1) obtained by synthesizing the noise components from the lower layer for actual noise removal through addition processing expressed as below.

$$n1'''(LL1)=n1''(LL1)+N2'(LL1) \quad (57)$$

n1'''(LL1) and n1"(LH1, HL1, HH1) are directly bundled together into n1'''(LL1, LH1, HL1, HH1). In processing (11-7), the noise signals n1'''(LL1, LH1, HL1, HH1) obtained by combining the noise components over the two layers, undergo inverse wavelet transformation, so as to generate a noise signal N1'(LL0) corresponding to the LL0 subband plane.

(2-3-4-6) Processing Executed at the Highest Resolution in the Real Space

In processing (10-6), the noise signal n0"(LL0), having been extracted from the LL0 subband plane and having undergone the weighting processing, is combined with N1'(LL0) obtained by synthesizing the noise components from the lower layer for actual noise removal through addition processing expressed as below.

$$n0'''(LL0)=n0''(LL0)+N1'(LL0) \quad (58)$$

The adjustability of the frequency characteristics may be further increased by selecting different levels of intensity for the noise components in varying resolutions when adding together the noise components over the two layers, as in the first embodiment. Likewise, under such circumstances, the processing should be executed as expressed below.

$$n4'''(LL4)=n4''(LL4)+\beta(5)*N5'(LL4) \quad (59)$$

$$n3'''(LL3)=n3''(LL3)+\beta(4)*N4'(LL3) \quad (60)$$

$$n2'''(LL2)=n2''(LL2)+\beta(3)*N3'(LL2) \quad (61)$$

$$n1'''(LL1)=n1''(LL1)+\beta(2)*N2'(LL1) \quad (62)$$

$$n0'''(LL0)=n0''(LL0)+\beta(1)*N1'(LL0) \quad (63)$$

It is to be noted that $0<\beta(1)\leq1$, $0<\beta(2)\leq1$, $0<\beta(3)\leq1$, $0<\beta(4)\leq1$ and $0<\beta(5)\leq1$.

A noteworthy feature of this processing is that two separate systems of noise synthesizing means are provided to generate two different types of noise components, one for noise extraction and the other for actual noise removal, through synthesis. As a result, the optimization processing executed to adjust the noise component intensity characteristics or adjust the noise component frequency characteristics in correspondence to a given application is facilitated.

In addition, as in the first embodiment, the noise component for the low-frequency subband is integrated through the noise synthesis processing by using noise components obtained from two different layers, i.e., the noise component made up with the noise components from both the low-frequency subband and the high-frequency subbands on the low resolution side and the noise component obtained from the low-frequency subband at the target resolution itself, which clearly differentiates the present invention from the related art. Consequently, the noise frequency characteristics adjustment is facilitated and noise components optimized for the individual purposes of use of the two separate systems can be combined.

(2-3-5) Actual Noise Removal Processing

The processing is executed in much the same way as "(2-3-4) Actual noise removal processing" in the first embodiment.

(2-4) Noise Removal from the Chrominance Component (aˆ)

The processing is executed in much the same way as "(2-4) noise removal from the chrominance component (aˆ)" in the first embodiment. However, the expressions used in the processing are defined slightly differently, and accordingly, they need to be modified as indicated below.

(2-4-1) Noise Component Frequency Characteristics Adjustment $$n1''(LH1)=k1(1)*n1(LH1) \quad (64)$$

$$n1''(HL1)=k1(1)*n1(HL1) \quad (65)$$

$$n1''(HH1)=k2(1)*n1(HH1) \quad (66)$$

$$n2''(LH2)=k1(2)*n2(LH2) \quad (67)$$

$$n2''(HL2)=k1(2)*n2(HL2) \quad (68)$$

$$n2''(HH2)=k2(2)*n2(HH2) \quad (69)$$

$$n3''(LH3)=k1(3)*n3(LH3) \quad (70)$$

$$n3''(HL3)=k1(3)*n3(HL3) \quad (71)$$

$$n3''(HH3)=k2(3)*n3(HH3) \quad (72)$$

$$n4''(LH4)=k1(4)*n4(LH4) \quad (73)$$

$$n4''(HL4)=k1(4)*n4(HL4) \quad (74)$$

$$n4''(HH4)=k2(4)*n4(HH4) \quad (75)$$

$$n5''(LH5)=k1(5)*n5(LH5) \quad (76)$$

$$n5''(HL5)=k1(5)*n5(HL5) \quad (77)$$

$$n5''(HH5)=k2(5)*n5(HH5) \quad (78)$$

During the processing, the following measures are taken. n1(LL1) and n1''(LH1, HL1, HH1) are directly bundled together into n1''(LL1, LH1, HL1, HH1).
n2(LL2) and n2''(LH2, HL2, HH2) are directly bundled together into n2''(LL2, LH2, HL2, HH2).
n3(LL3) and n3''(LH3, HL3, HH3) are directly bundled together into n3''(LL3, LH3, HL3, HH3).
n4(LL4) and n4''(LH4, HL4, HH4) are directly bundled together into n4''(LL4, LH4, HL4, HH4).
n5(LL5) and n5''(LH5, HL5, HH5) are directly bundled together into n5''(LL5, LH5, HL5, HH5).

(2-5) Noise Removal from the Chrominance Component (bˆ)

The processing is executed in much the same way as "(2-4) noise removal from the chrominance component (aˆ)".

As described above, in the second embodiment, two types of processing, equivalent to two different types of noise removal, are executed each for purposes of noise extraction or noise removal, and the noise removal results of the noise removal from the lower layer high-frequency subbands as well as the results of the noise removal from the lower layer low-frequency subband are allowed to affect the execution of the noise extraction from the low-frequency subband in the upper layer. Namely, noise is extracted sequentially from both the high-frequency subbands and the low-frequency subband constituting images obtained through multiple resolution transformation while allowing the processing of either type of subband to be influenced by the characteristics of the other type of subband, as in the first embodiment. Consequently, the level of freedom with which different frequency bands can be combined in the processing increases and the noise removal can be executed in the frequency spaces optimized for the noise extraction. This means that fine noise removal is enabled without loss of image structure while minimizing the residual noise that is not extracted.

Namely, fine noise removal processing (edge-preserving smoothing) assuring a high level of image structure preservation while effectively addressing the issue of residual noise in a regular image such as a digital picture, is realized through the embodiment.

The difference between the first embodiment and the second embodiment is briefly explained. It has been confirmed through testing that by adjusting the parameter settings, substantially equal levels of noise removal effect and countermeasures against residual noise can be achieved through the sequential analysis method and the sequential synthesis method. A noteworthy difference between them may be the different orders with which the individual processing phases are executed. Namely, the "sequential analysis" method, in which the low-resolution side is executed at a later stage, is more effective in preventing leakage of the noise of a long cycle component extracted on the low resolution side that is bound to affect the processing executed at another resolution. The "sequential synthesis" method, in which the high-resolution side is processed at a later stage, is more effective in preventing leakage of the noise extracted on the high resolution side and is thus more effective when adopted to extract persistent noise with a Nyquist frequency, such as a checkered pattern.

Figure 17:
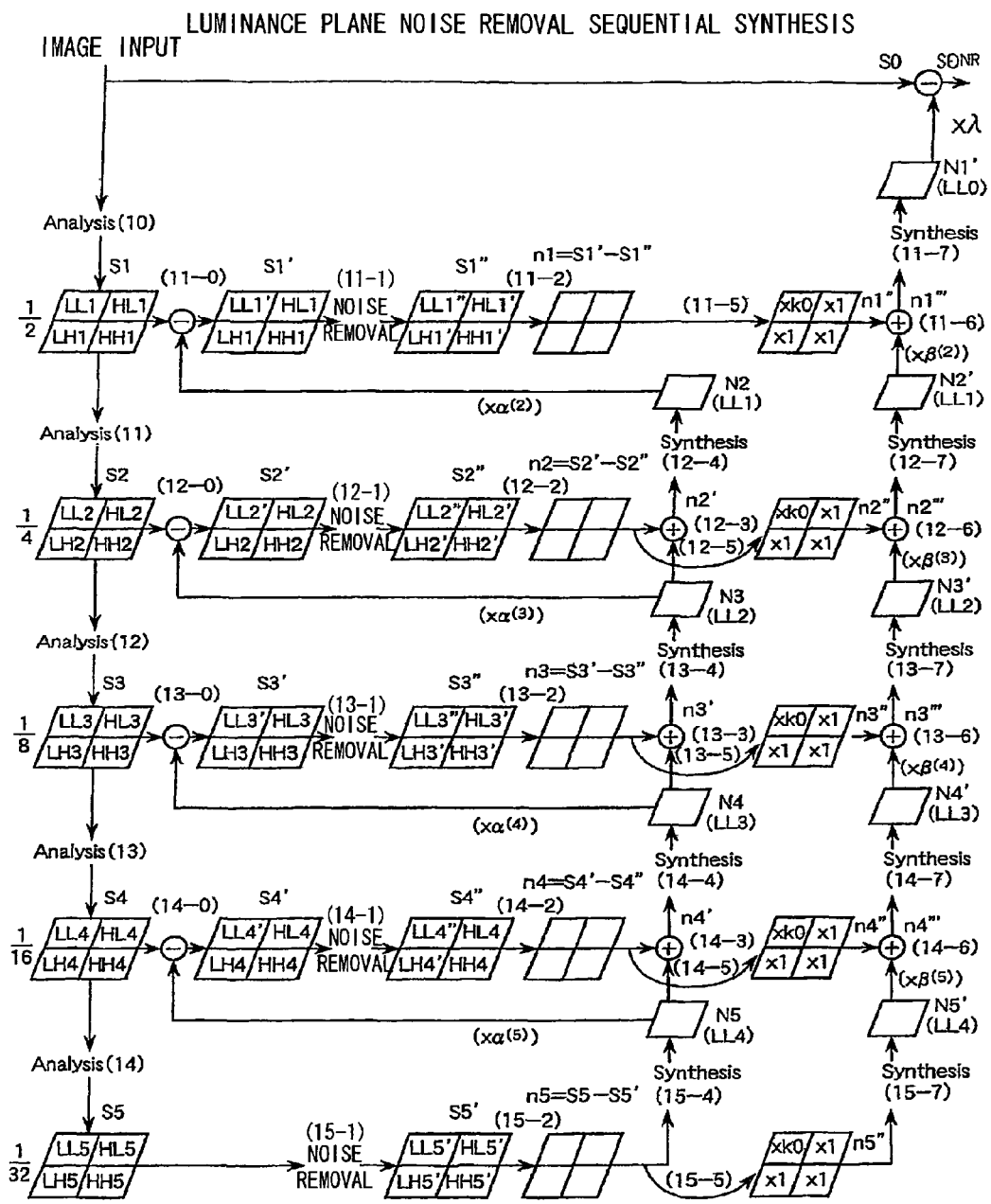

It is to be noted that in the embodiment, a specific type of noise removal processing is executed on the image signal S0(LL0) in the real space (see FIG. 10). However, a load of the processing executed on the image signal S0(LL0) in the real space is bound to be extremely heavy. Even through the processing executed at lower resolutions equal to or lower than that corresponding to the image signals S1(LL1, LH1. HL1, HH1) in the embodiment alone, a sufficient level of fine noise removal processing is achieved. Accordingly, the specific noise removal processing executed on the image signal S0(LL0) in the real space may be skipped. FIG. 17 presents a flowchart of the processing executed on the luminance component (luminance signal) by skipping the specific noise removal processing on the image signal S0(LL0) in the real space in FIG. 10. The chrominance components, too, may be processed in a similar manner. Through these measures, fine noise removal processing can be executed with a lighter processing load.

Third Embodiment

Examples of noise removal processing have been described in reference to the first and second embodiments. In the third embodiment, the present invention is adopted in edge emphasis processing, instead of in noise removal processing, so as to facilitate adjustment of the frequency characteristics at multiple resolutions.

Figure 12:
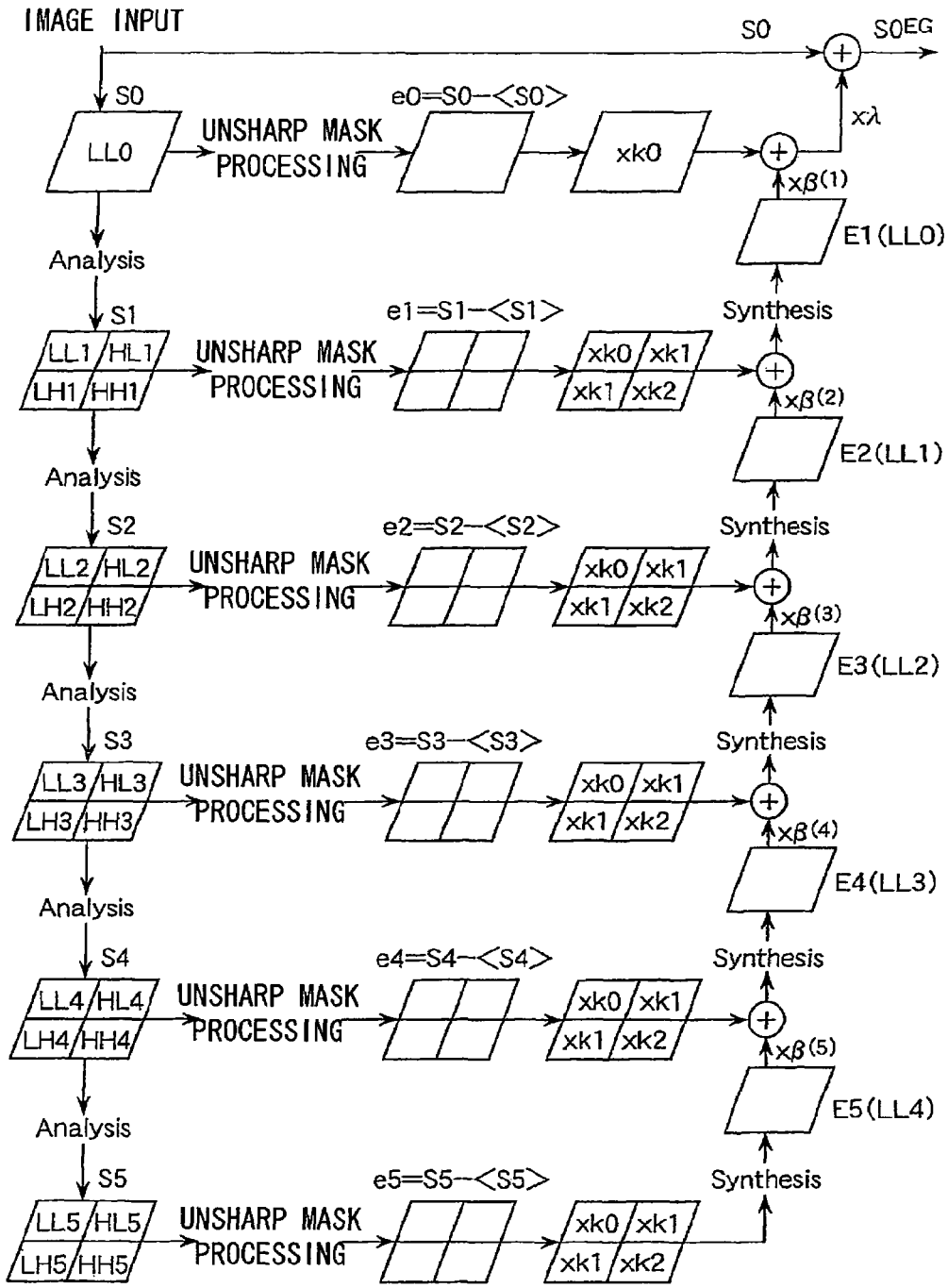

Since the image processing apparatus in the third embodiment assumes a structure similar to that of the image processing apparatus in the first embodiment, its explanation is omitted. FIG. 12 presents a flowchart of the edge emphasis processing executed in conjunction with multiple resolution transformation. The processing differs from that in the preceding embodiments only in that it does not include the sequential processing feedback routine executed in the noise removal and that edge component extraction processing, instead of the noise component extraction processing, is executed. The edge component extraction processing may be executed through, for instance, unsharp mask processing or band pass filter processing executed on the individual subband planes.

The edge component extraction processing may be executed by using the multiple-resolution images obtained through transformation for noise component extraction as has been explained in reference to the first embodiment and the second embodiments, concurrently while the noise component extraction processing is executed, or the edge component extraction processing may be executed on an image having undergone the noise removal processing in the first embodiment or the second embodiment. As an alternative, the edge component extraction processing alone may be executed as long as the target image simply requires edge emphasis. It is to be noted that the edge component extraction processing should, in principle, be executed on the luminance plane alone.

While the explanation of the embodiment provided below is simplified by assuming that the edge emphasis processing is executed by itself, it is more desirable from the viewpoint of image quality, to execute the noise removal and the edge emphasis at the same time. More specifically, it is desirable to synthesize edge components extracted from subband planes having undergone the virtual intense noise removal to achieve a noise-free state, as has been explained in reference to the first and second embodiments, so as to ensure that the extracted edge components do not contain any noise component and then to incorporate through addition processing the synthesized edge component to the image having undergone the actual noise removal. Accordingly, if the edge emphasis is executed in conjunction with the processing in, for instance, the second embodiment, the synthesis processing on the right hand side in FIG. 10 will include three processing phases, 1) noise component synthesis for virtual noise removal, 2) noise component synthesis for actual noise removal and 3) edge component synthesis for actual edge emphasis.

While the present invention, adopted in noise removal processing executed in conjunction with multiple resolution transformation, facilitates adjustment of the noise component frequency characteristics and noise component removal intensity so that the user is able to easily check how the target image is visually altered through the noise removal. It also provides a system that allows the edge component frequency characteristics and intensity to be freely adjusted so that the user is able to easily check how the target image is visually affected through the edge emphasis when it is adopted in edge emphasis processing executed in conjunction with multiple resolution transformation.

The frequency characteristics of the extracted edge components are altered by adjusting the weights applied to the low-frequency subband (LL) and the high-frequency subbands (LH, HL, HH). FIG. 13 shows the weighting coefficients applied to the low-frequency subband (LL) and the high-frequency subbands (LH, HL, HH). k1 may assume different values in correspondence to LH and HL. The term "low-frequency subband" is used in this context to refer to a low-frequency edge component image, whereas the term "high-frequency subbands" is used in this context to refer to a high-frequency edge component image.

The low-frequency edge component image and the high-frequency edge component images with the weights applied thereto modulated in correspondence to the different edge component frequency bands are utilized in inverse wavelet transformation. As shown in FIG. 12, the inverse wavelet transformation (synthesis) is executed repeatedly in sequence by using the low-frequency edge component image and the high-frequency edge component images with the weights applied thereto modulated at each resolution until a single edge component image, the resolution of which matches that of the original image, is obtained. Finally, based upon the synthesized edge component, the edges in the original image are emphasized.

As in the first embodiment and the second embodiment, edge components are extracted from both the high-frequency subbands and the low-frequency subband at each specific level of resolution among the multiple-resolutions and the edge components having been extracted are synthesized by applying specific weighting coefficients to the different subbands. As a result, the entire edge component frequency band is covered and an environment in which the frequency characteristics can be adjusted with ease and the visual effect of the edge emphasis can be adjusted is provided.

Figure 18:
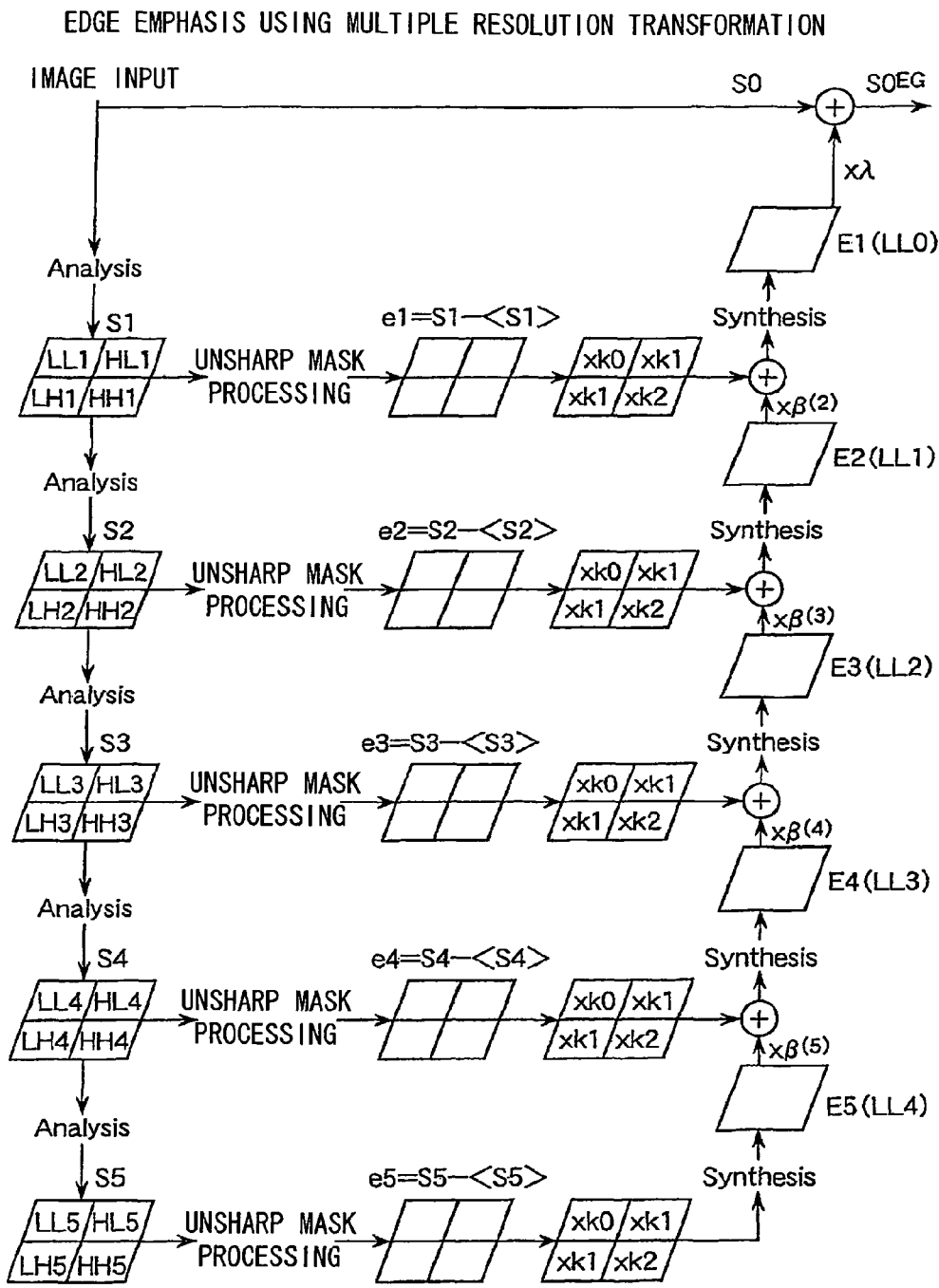

It is to be noted that in the embodiment, a specific type of edge component extraction processing is executed on the image signal S0(LL0) in the real space (see FIG. 10). However, a load of the processing executed on the image signal S0(LL0) in the real space is bound to be extremely heavy. Even through the processing executed at lower resolutions equal to or lower than that corresponding to the image signals S1(LL1, LH1. HL1, HH1) in the embodiment alone, a sufficient level of fine edge emphasis processing is achieved. Accordingly, the specific edge component extraction processing executed on the image signal S0(LL0) in the real space may be skipped. FIG. 18 presents a flowchart of the edge emphasis processing executed in conjunction with multiple resolution transformation by skipping the specific edge component extraction processing on the image signal S0(LL0) in the real space in FIG. 12. Through these measures, effective emphasis processing can be executed with a lighter processing load.

(Variations)

It is to be noted that the first through third embodiments have been described by assuming that the multiple resolution transformation is executed through wavelet transformation. Instead of wavelet transformation, Laplacian pyramids may be utilized in the multiple resolution transformation. Individual Gaussian pyramids generated during the process of Laplacian pyramid generation correspond to the low-frequency subband (LL) generated through the wavelet transformation, whereas individual Laplacian pyramids correspond to the high-frequency subbands (LH, HL, HH) generated through the wavelet transformation. It is to be noted that while a low-frequency subband and the corresponding high-frequency subbands generated through the wavelet transformation assume matching resolutions, the resolution of the Laplacian bands, i.e., the high-frequency subbands, corresponding to a specific Gaussian band, i.e., the low-frequency subband, is higher by one step relative to the resolution of the Gaussian band.

Reference "P. H. Burt and E. H. Adelson, "The Laplacian Pyramid as a Compact Image Code", IEEE Transactions on Communication, vol. 31, No. 4, pp 532~540, 1983" may be referred to for further details on Laplacian pyramids.

In addition, instead of the Laplacian pyramid representation, a Steerable pyramid (Steerable wavelet transformation, directional wavelet transformation) representation may be adopted in the multiple resolution transformation. In the Steerable pyramid representation, too, the Gaussian band generated through Laplacian pyramid generation directly corresponds to the low-frequency subband. However, while a single type of isotropic high pass component is generated as a Laplacian band corresponding to a high-frequency subband in the Laplacian pyramid representation, a plurality of Laplacian bands with anisotropic high pass components taken along a plurality of directions correspond to high-frequency subbands in the Steerable pyramid representation.

Reference "W. T. Freeman and E. H. Adelson, "The Design and Use of Steerable Filters", IEEE Transaction On Pattern and Machine Intelligence, Vol 13 No. 9, pp. 891~906, September 1991" may be referred to for further details on Steerable filters.

Figure 14:
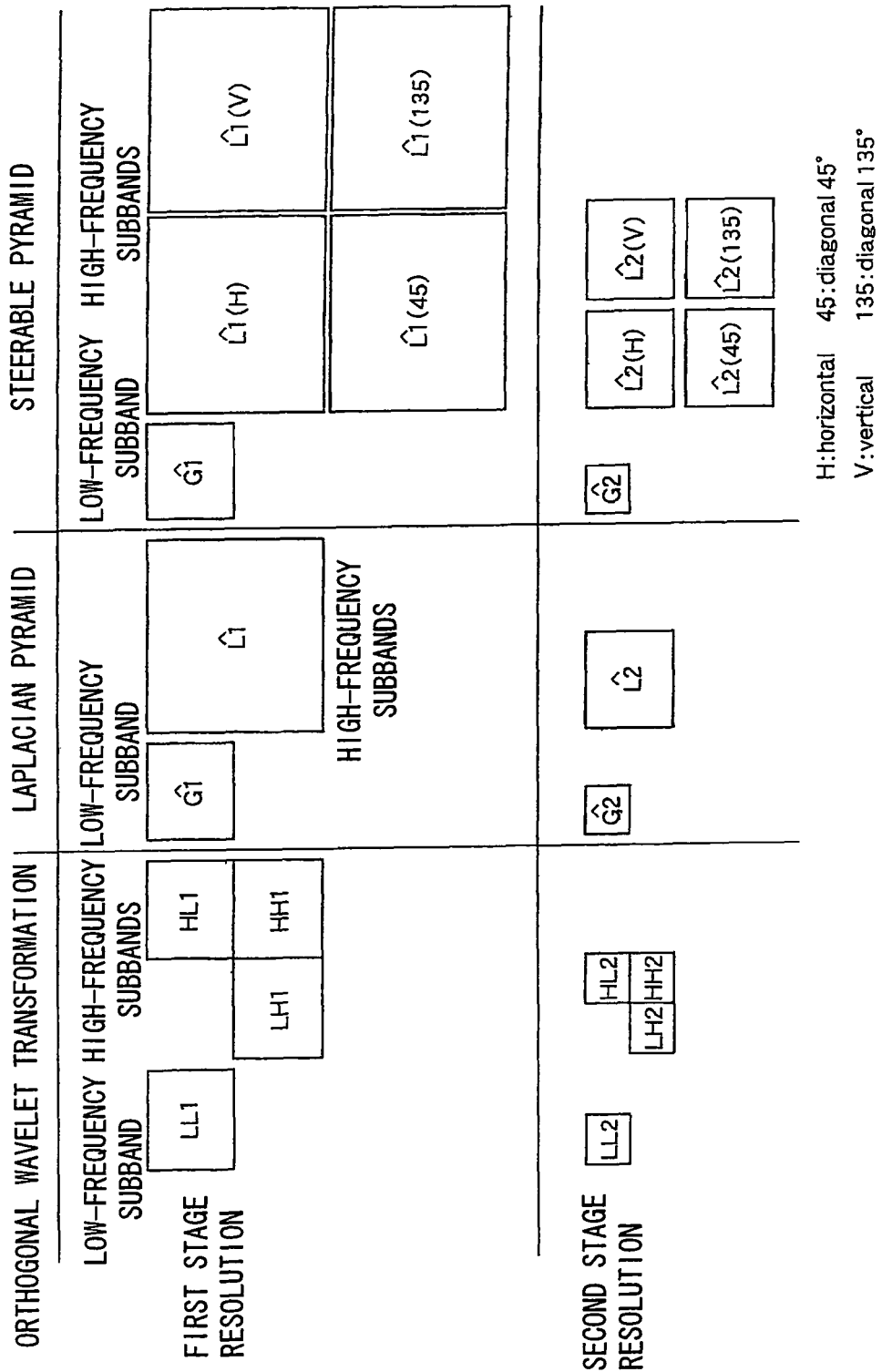

FIG. 14 presents a schematic diagram indicating the correspondence between the low-frequency subband and the high-frequency subbands in each type of multiple-resolution representations among the orthogonal wavelet transformation, the Laplacian pyramid and the Steerable pyramid.

In the first embodiment, noise is removed from both the luminance component and the chrominance components through the "sequential analysis" method, whereas in the second embodiment, noise is removed from both the luminance component and the chrominance components through the "sequential synthesis" method. Instead, noise may be removed from the luminance component through the sequential analysis and from the chrominance components through the sequential synthesis. As an alternative, noise may be removed from the luminance component through the sequential synthesis and from the chrominance components through the sequential analysis.

In the first embodiment described earlier, the band-limited images in each band resulting from the wavelet transformation individually undergo virtual noise removable processing, noise components are extracted from the band-limited images having undergone the virtual noise removable processing, the extracted noise components are synthesized through inverse wavelet transformation and the actual noise-free image is generated by subtracting the synthesized noise components from the image in the real space. As an alternative, virtual noise removal processing may be executed based upon the individual band-limited images in each band, noise components may be extracted from the band-limited images having undergone the virtual noise removal processing, actual noise-free images may be generated by using the extracted noise components, the noise-free images thus generated may be synthesized through inverse wavelet transformation and the synthesized noise-free image may be output as the actual noise-free image.

Figure 20:
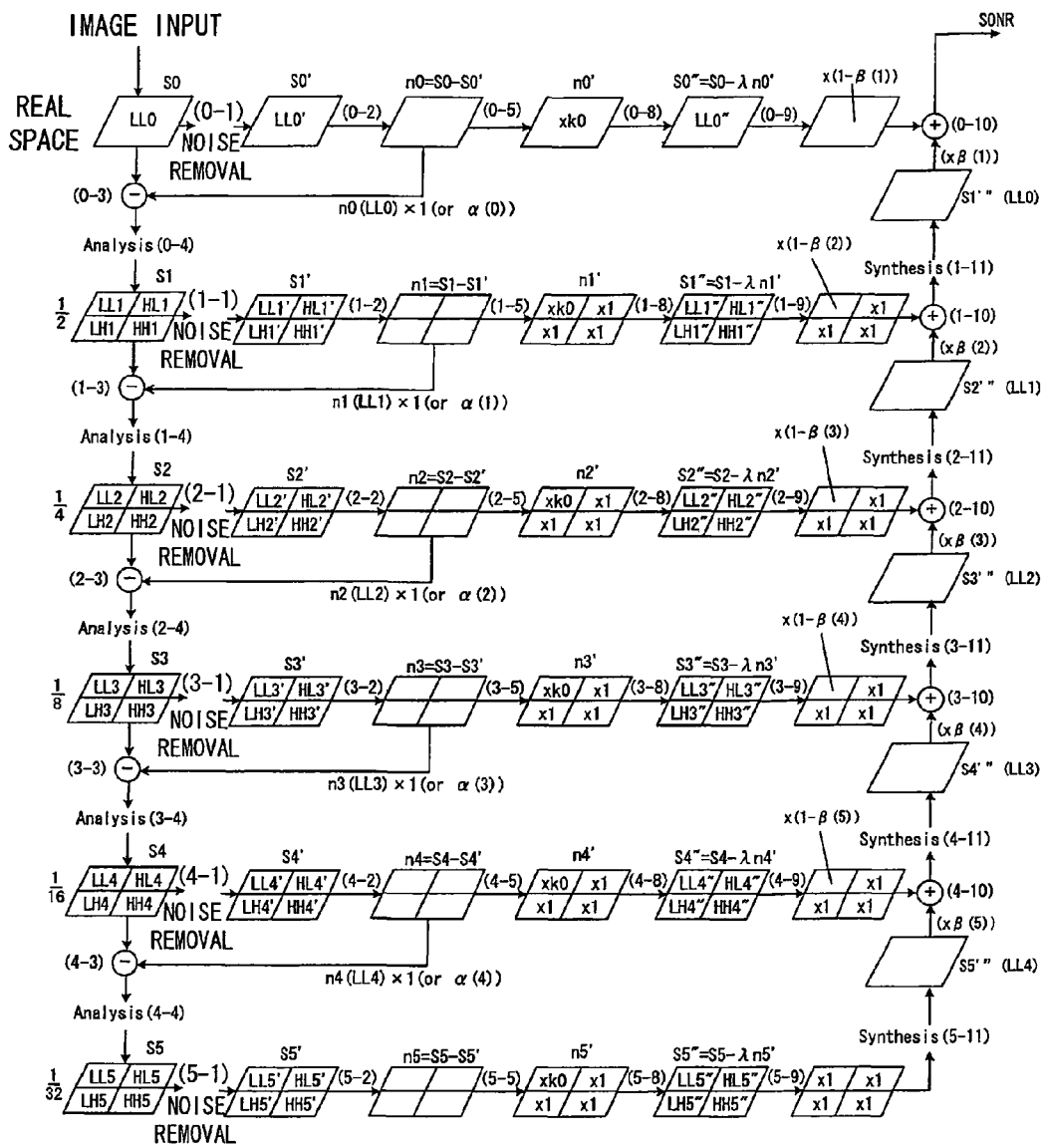

FIG. 20 presents a flowchart of such noise removal processing executed on the luminance component (luminance signal). FIG. 20 corresponds to FIG. 3 in reference to which the first embodiment has been described. The processing executed at, for instance, the ½ resolution is identical to that executed in the first embodiment up to the point at which the noise components are extracted in processing (1-5). Subsequently, in processing (1-8), actual noise-free image signals S1"(LL1", LH1", HL1", HH1") are generated by subtracting noise components n1' obtained by applying specific weights k0:1:1:1 to the extracted noise components n1 from the image signals S1(LL1, LH1, HL1, HH1). During this process, noise removal is executed after applying a weighting coefficient parameter $\lambda$, i.e., the noise removal factor, to the extracted noise components n1' so as to enable adjustment of the extent of noise removal for the entire image. The weighting coefficient parameter $\lambda$ is similar to the weighting coefficient parameter $\lambda$ used in the final noise removal processing executed in the real space in the first embodiment.

In addition, since S2'''(LL1) obtained by synthesizing the noise components from the subbands at the lower resolution is multiplied by the coefficient $\beta(2)$, LL1" is multiplied by a coefficient $(1-\beta(2))$ in processing (1-9). Then, in processing (1-10) the following arithmetic operation is executed.

S1"((1−$\beta$(2))×LL1",LH1",HL1",HH1")+S2'''($\beta$(2)× LL1)

Subsequently, inverse wavelet transformation is executed on the results of processing (1-10), so as to generate a signal with the resolution higher by one stage, i.e., the signal S1'''(LL0) with the resolution in the real space in this example. This processing is sequentially executed starting at the lowermost layer resolution and, ultimately, a noise-free image S0 NR obtained by synthesizing all the band-limited images having undergone the actual noise removal, including the band-limited images at the real space resolution, is output.

Similar results can be achieved either by synthesizing the noise components having been extracted in the individual bands resulting from the wavelet transformation, subtracting the synthesized noise component from the image in the real space so as to generate the actual noise-free image, as has been explained earlier, or by generating actual noise-free images in the individual bands and synthesizing the noise-free images thus generated through inverse wavelet transformation to generate an actual noise-free image, as explained in reference to the current variation.

It is to be noted that examples of possible variations of the first embodiments have been described so far, the second embodiments and the third embodiments allow for similar variations.

While the processing is executed by the personal computer 1 in the embodiments described above, the present invention is not limited to this example. For instance, the present invention may be adopted in processing executed in an image-capturing device such as a camera, or it may be adopted in another type apparatus. In other words, the present invention can be adopted in all types of apparatus that handle image data.

While two different types of noise removal, i.e., the virtual noise removal and the actual noise removal, are executed during the process of synthesizing the noise components provided through two systems in the sequential synthesis explained earlier in reference to the embodiments, the present invention is not limited to this example. For instance, when reconstructing an image by synthesizing noise-free subbands images, two different types of noise-free subbands images may be generated to be individually synthesized through two separate systems as disclosed in patent references 5 (U.S. Pat. No. 5,526,446) and 9 (U.S. Pat. No. 6,937,772) in the related art.

While the modified bilateral filter and the Laplacian noise extraction method have been described earlier as typical examples of noise removal processing, the noise removal processing may be executed by using another type of noise removal filter.

Although various embodiments and variations have been explained in the above description, the present invention is not to be considered to be limited to the details thereof. Other possibilities that may be considered to fall within the range of the technical concept of the present invention are also included within the scope of the present invention.

The disclosure of the following priority application is herein incorporated by reference:
Japanese Patent Application No. 2006-096986 filed Mar. 31, 2006

The invention claimed is:

1. An image processing method adopted to remove noise present in an image, comprising:
   an image input step in which an original image constituted of a plurality of pixels is input;
   a multiple-resolution images generation step in which a plurality of band-limited images with resolutions decreasing in sequence are generated by filtering the input original image;

a first noise removal step in which virtual noise removal processing is executed individually for each of the band-limited images;

a second noise removal step in which actual noise removal processing is executed for the individual band-limited images based upon the band-limited images from which noise has been virtually removed through the first noise removal step; and an image acquisition step in which a noise-free image of the original image is obtained based upon the individual band-limited images from which noise has been actually removed through the second noise removal step, wherein:

the virtual noise removal processing executed in the first noise removal step and the actual noise removal processing executed in the second noise removal step are differentiated in correspondence to a frequency band of a band-limited image.

2. An image processing method according to claim 1, wherein:

noise is removed to a greater extent in the virtual noise removal processing executed in the first noise removal step relative to the actual noise removal processing executed in the second noise removal step.

3. An image processing method adopted to remove noise present in an image, comprising:

an image input step in which an original image constituted of a plurality of pixels is input;

a multiple-resolution images generation step in which a plurality of band-limited images with resolutions decreasing in sequence are generated by filtering the input original image;

a first noise extraction step in which noise components contained in the band-limited images are individually extracted;

a second noise extraction step in which noise components to be reflected in the original image are re-extracted from the individual band-limited images based upon the noise components having been extracted from the band-limited images in the first noise extraction step;

a noise synthesis step in which the noise components having been re-extracted from the band-limited images in the second noise extraction step are synthesized; and an image acquisition step in which a noise-free image of the original image is acquired based upon the synthesized noise component.

4. An image processing method according to claim 3, wherein:

the noise components are re-extracted intrinsically from the individual band-limited images in correspondence to frequency bands of the band-limited images in the second noise extraction step.

5. An image processing method according to claim 4, wherein:

low-frequency images and high-frequency images with resolutions decreasing in sequence are generated in the multiple-resolution images generation step; and the noise components to be reflected in the original image are re-extracted by weighting the noise components having been extracted in the first noise extraction step differently between the low-frequency images and the high-frequency images in the second noise extraction step.

6. An image processing method according to claim 4, wherein:

the noise components to be reflected in the original image are re-extracted by weighting the noise components having been extracted in the first noise extraction step differently between band-limited images with varying levels of resolution in the second noise extraction step.

7. An image processing method adopted to remove noise present in an image, comprising:

an image input step in which an original image constituted of a plurality of pixels is input;

a multiple-resolution images generation step in which a plurality of band-limited images with resolutions decreasing in sequence are generated by filtering the input original image;

a noise extraction step in which a noise component contained in one of the band-limited images is extracted and then a noise component in another band-limited image is extracted in sequence based upon the noise component having been extracted; and a noise removal step in which noise in the original image is removed based upon noise components in the individual band-limited images having been extracted, wherein:

a signal intensity level with which the noise component extracted from one band-limited image in the noise extraction step is reflected when extracting the noise component from another band-limited image during the noise extraction step is set differently from a signal intensity level with which the noise component extracted from one band-limited image in the noise extraction step is reflected in the original image during the noise removal step.

8. An image processing method according to claim 7, wherein:

the noise component contained in the one band-limited image is extracted and a noise component contained in another band-limited image assuming a different resolution is extracted in sequence based upon the noise component having been extracted in the noise extraction step.

9. An image processing method according to claim 7, wherein:

low-frequency images and high-frequency images with resolutions decreasing in sequence are generated in the multiple-resolution images generation step.

10. An image processing method adopted to remove noise present in an image, comprising:

an image input step in which an original image constituted of a plurality of pixels is input;

a multiple-resolution images generation step in which sets of band-limited images each constituted with at least two types of band-limited images are generated in sequence over a plurality of resolutions by filtering the input original image, generating a set of band-limited images constituted with at least two different types of band-limited images and then repeatedly filtering at least one type of band-limited images among the band-limited images;

a noise extraction step in which processing whereby noise components contained in the two types of band-limited images are extracted and a noise component in at least one type of band-limited image at another resolution is extracted based upon the extracted noise components, is executed in sequence so as to extract noise components in the individual band-limited images at various resolutions; and a noise removal step in which noise in the original image is removed from based upon noise components in the individual band-limited images having been extracted, wherein:

an inter-band signal intensity with which a set of noise components of at least two types of band-limited images obtained through the noise extraction step is reflected when extracting the noise component in another band-limited image in the noise extraction step is set differently from an inter-band signal intensity with which the set of noise components of at least two types of band-limited images obtained through the noise extraction step is reflected in the original image during the noise removal step.

11. An image processing method according to claim 7, wherein:

two different types of images that are low-frequency images and high-frequency images are generated to make up the sets of band-limited images constituted with at least two different types of band-limited images in the multiple resolution image generation step.

12. An image processing method adopted to remove noise present in an image, comprising:

an image input step in which an original image constituted of a plurality of pixels is input;

a multiple-resolution images generation step in which one or more low-frequency images with resolutions decreasing in sequence and one or more high-frequency images with the resolutions decreasing in sequence are generated by decomposing the input original image;

a noise modulation step in which a noise component contained in each low-frequency image and a noise component contained in each high-frequency image are individually extracted, a low-frequency noise image and a high-frequency noise image are generated in correspondence to the low-frequency image and the high-frequency image and weights applied to the noise components over different frequency bands are modulated by applying a weighting coefficient to at least either the low-frequency noise image or the high-frequency noise image having been generated;

a noise synthesis step in which the low-frequency noise image and the high-frequency noise image having undergone the noise modulation step are combined to generate a single synthesized noise image with higher resolution by one stage and noise images are repeatedly synthesized in sequence until a single noise image signal with a resolution matching the resolution of the original image is obtained; and a noise removal step in which noise contained in the original image is removed based upon the synthesized noise image signal.

13. An image processing method adopted to remove noise present in an image, comprising:

an image input step in which an original image constituted of a plurality of pixels is input;

a multiple-resolution images generation step in which one or more low-frequency images having resolutions decreasing in sequence and one or more high-frequency images with the resolutions decreasing in sequence are generated by decomposing the input original image;

a noise extraction step in which a noise component contained in each low-frequency image and a noise component contained in each high-frequency image are individually extracted and a low-frequency noise image and a high-frequency noise image are generated in correspondence to the low-frequency image and the high-frequency image;

a noise modulation step in which weights applied to the noise components over different frequency bands are modulated by applying a weighting coefficient to at least either the low-frequency noise image or the high-frequency noise image having been generated;

a noise synthesis step in which the low-frequency noise image and the high-frequency noise image having undergone the noise modulation step are combined to generate a single synthesized noise image with higher resolution by one stage and the synthesized noise image with the higher resolution is combined with the low-frequency noise image corresponding to the low-frequency image with the higher resolution by one stage so as to generate a new synthesized low-frequency noise image;

a noise synthesis repeating step in which synthesis is repeatedly executed by repeating a sequence of the noise extraction step, the noise modulation step and the noise synthesis step until a single noise image signal with a resolution matching the resolution of the original image is obtained; and a noise removal step in which noise contained in the original image is removed based upon the synthesized noise image signal.

14. An image processing method adopted to remove noise present in an image, comprising:

an image input step in which an original image constituted of a plurality of pixels is input;

a multiple-resolution images generation step in which one or more low-frequency images with resolutions decreasing in sequence and one or more high-frequency images with the resolutions decreasing in sequence are generated by decomposing the input original image;

a noise extraction step in which a noise component contained in each low-frequency image and a noise component contained in each high-frequency image are individually extracted and a low-frequency noise image and a high-frequency noise image are generated in correspondence to the low-frequency image and the high-frequency image;

a noise modulation step in which weights applied to the noise components over different frequency bands are modulated by applying a weighting coefficient to at least either the low-frequency noise image or the high-frequency noise image having been generated;

a noise synthesis step in which the low-frequency noise image and the high-frequency noise image having undergone the noise modulation step are combined to generate a single synthesized noise image with higher resolution by one stage; and a noise removal step in which noise contained in the original image is removed based upon the synthesized noise image.

15. An image processing method adopted to remove noise present in an image, comprising:

an image input step in which an original image constituted of a plurality of pixels is input;

a multiple-resolution images generation step in which one or more low-frequency images with resolutions decreasing in sequence and one or more high-frequency images with the resolutions decreasing in sequence are generated by decomposing the input original image;

a noise extraction step in which a noise component contained in each low-frequency image and a noise component contained in each high-frequency image are individually extracted and a low-frequency noise image and a high-frequency noise image are generated in correspondence to the low-frequency image and the high-frequency image;

a noise modulation step in which weights applied to the noise components over different frequency bands are modulated by applying a weighting coefficient to at least either the low-frequency noise image or the high-frequency noise image having been generated;

a noise synthesis step in which the low-frequency noise image and the high-frequency noise image having undergone the noise modulation step are combined to generate a single synthesized noise image with higher resolution by one stage and the synthesized noise image with the higher resolution is combined with the low-frequency noise image corresponding to the low-frequency image with the higher resolution by one stage so as to generate a new synthesized low-frequency noise image; and a noise removal step in which noise contained in the original image is removed based upon the synthesized noise image signal.

16. An image processing method according to claim 12, wherein:

the low-frequency noise image and the high-frequency noise image corresponding to the low-frequency image and the high-frequency image are generated based upon observation of local signal values in the low-frequency image and the high-frequency image in the noise extraction step.

17. An image processing method adopted to emphasize edges in an image, comprising:

an image input step in which an original image constituted of a plurality of pixels is input;

a multiple-resolution images generation step in which one or more low-frequency images with resolutions decreasing in sequence and one or more high-frequency images with the resolutions decreasing in sequence are generated by decomposing the input original image;

an edge component generation step in which an edge component is extracted by applying a band pass filter to each low-frequency image and an edge component is extracted by applying a band pass filter to each high-frequency image and a low-frequency edge component image and a high-frequency edge component image are generated in correspondence to the low-frequency image and the high-frequency image;

an edge component modulation step in which weights applied to the edge components over different frequency bands are modulated by applying a weighting coefficient to at least either the low-frequency edge component image or the high-frequency edge component image having been generated;

an edge component synthesis step in which the low-frequency edge component image and the high-frequency edge component image having undergone the edge component modulation step are combined to generate a single synthesized edge component image with higher resolution by one stage and edge component images are repeatedly synthesized in sequence until a single edge component image with a resolution thereof matching the resolution of the original image is obtained; and an edge emphasis step in which edges contained in the original image are emphasized based upon the synthesized edge component image.

18. An image processing method adopted to emphasize edges in an image, comprising:

an image input step in which an original image constituted of a plurality of pixels is input;

a multiple-resolution images generation step in which one or more low-frequency images having resolutions decreasing in sequence and one or more high-frequency images with the resolutions decreasing in sequence are generated by decomposing the input original image;

an edge component generation step in which an edge component is extracted by applying a band pass filter to each low-frequency image and an edge component is extracted by applying a band pass filter to each high-frequency image and a low-frequency edge component image and a high-frequency edge component image are generated in correspondence to the low-frequency image and the high-frequency image;

an edge component modulation step in which weights applied to the edge components over different frequency bands are modulated by applying a weighting coefficient to at least either the low-frequency edge component image or the high-frequency edge component image having been generated;

an edge component synthesis step in which the low-frequency edge component image and the high-frequency edge component image having undergone the edge component modulation step are combined to generate a single synthesized edge component image with a higher resolution by one stage; and an edge emphasis step in which edges contained in the original image are emphasized based upon the synthesized edge component image.

19. An image processing method according to claim 5, wherein:

the low-frequency image and the high-frequency image correspond to;
  1) a low-frequency component and a high-frequency component generated through orthogonal wavelet transformation;
  2) a Gaussian component and a Laplacian component in a Laplacian pyramid representation; or
  3) a low-frequency component and high-frequency components each corresponding to a specific direction in directional wavelet transformation.

20. An image processing method according to claim 19, wherein:

when multiple-resolution images are generated through two-dimensional orthogonal wavelet transformation, the low-frequency image corresponds to an LL subband and the high-frequency image corresponds to an LH subband, an HL subband or an HH subband.

21. An image processing method adopted to remove noise present in an image, comprising:

inputting an original image constituted of a plurality of pixels;

sequentially generating images with varying resolutions by that the input original image undergoes multiple resolution transformation;

extracting a noise component by using an image generated at a given resolution;

using the noise component extracted at the given resolution for purposes of extracting a noise component at another resolution and synthesizing a noise component to be removed from the original image through inverse multiple resolution transformation; and applying different weights to the noise component extracted at the given resolution to be used for purposes of extracting the noise component at the other resolution and to the noise component extracted at the given resolution to be used to synthesize the noise component to be removed from the original image through inverse multiple resolution transformation.

22. An image processing program stored on a non-transitory computer readable medium configured to enable a computer or an image processing apparatus to execute an image processing method, the method comprising:

- an image input step in which an original image constituted of a plurality of pixels is input;
- a multiple-resolution images generation step in which a plurality of band-limited images with resolutions decreasing in sequence are generated by filtering the input original image;
- a first noise removal step in which virtual noise removal processing is executed individually for each of the band-limited images;
- a second noise removal step in which actual noise removal processing is executed for the individual band-limited images based upon the band-limited images from which noise has been virtually removed through the first noise removal step; and
- an image acquisition step in which a noise-free image of the original image is obtained based upon the individual band-limited images from which noise has been actually removed through the second noise removal step, wherein:
- the virtual noise removal processing executed in the first noise removal step and the actual noise removal processing executed in the second noise removal step are differentiated in correspondence to a frequency band of a band-limited image.

23. An image processing apparatus, comprising:
- an image processing program according to claim 22 installed therein.

* * * * *